US008436270B2

(12) United States Patent
Lindsay et al.

(10) Patent No.: US 8,436,270 B2

(45) Date of Patent: May 7, 2013

(54) METHOD AND APPARATUS FOR CUTTING HIGH QUALITY INTERNAL FEATURES AND CONTOURS

(75) Inventors: Jon W. Lindsay, Hanover, NH (US); Guy T. Best, Bethel, VT (US); Peter V. Brahan, North Sutton, NH (US); Gregory S. Wilson, Newbury, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 13/250,979

(22) Filed: Sep. 30, 2011

(65) Prior Publication Data

US 2012/0048835 A1 Mar. 1, 2012

Related U.S. Application Data

(63) Continuation of application No. 12/557,920, filed on Sep. 11, 2009, which is a continuation-in-part of application No. 12/341,731, filed on Dec. 22, 2008, and a continuation-in-part of application No. 12/466,786, filed on May 15, 2009.

(60) Provisional application No. 61/154,259, filed on Feb. 20, 2009.

(51) Int. Cl.
*B23K 10/00* (2006.01)

(52) U.S. Cl.
USPC ............ 219/121.44; 219/121.39; 219/121.59; 219/121.55

(58) Field of Classification Search ............. 219/121.39, 219/121.44, 121.46, 121.51, 121.55, 121.59, 219/75
See application file for complete search history.

(56) References Cited

U.S. PATENT DOCUMENTS 5,380,976 A 1/1995 Couch, Jr. et al.
5,591,357 A 1/1997 Couch, Jr. et al.
5,614,110 A * 3/1997 Shintani et al. .......... 219/121.44
5,695,662 A 12/1997 Couch, Jr. et al.
5,801,355 A * 9/1998 Saio et al. ................ 219/121.44
5,893,986 A 4/1999 Oakley et al.

(Continued)

FOREIGN PATENT DOCUMENTS

CN 1118581 A 3/1996
EP 0 719 613 7/1996

(Continued)

OTHER PUBLICATIONS

ESAB Welding and Cutting Products: "M3 Plasma Mechanized Plasmarc Cutting Torch, Instruction Manual" Oct. 2008.

(Continued)

*Primary Examiner* — Mark Paschall

(74) *Attorney, Agent, or Firm* — Proskauer Rose LLP

(57) ABSTRACT

An automated method for cutting a plurality of hole features using a plasma arc torch system can be implemented on a computer numerical controller. The automated method can include the steps of: a) cutting a lead-in for a hole feature using a lead-in command speed based on a diameter of that hole feature and b) cutting a perimeter for the hole feature using a perimeter command speed greater than the corresponding lead-in command speed for the hole feature. The automated method can also include the step c) of repeating steps a) and b) for each additional hole feature having a same diameter or a different diameter.

10 Claims, 24 Drawing Sheets

Cut in first zone using a first command speed — Step 310

Cut in second zone using a second command speed — Step 320

Ramp down cutting current in the third zone — Step 330

Maintain or further increase the command speed in the third zone — Step 340

Cutting current extinguished (e.g., reaches 0 Amperes) — Step 350

Decelerate torch speed after cutting current extinguished — Step 360

U.S. PATENT DOCUMENTS

| | | | | |
|---|---|---|---|---|
| 6,232,574 | B1 | 5/2001 | Oakley | |
| 7,067,762 | B2 * | 6/2006 | Yamaguchi et al. | 219/121.44 |
| 7,087,855 | B2 * | 8/2006 | Yamaguchi et al. | 219/121.39 |
| 2005/0035093 | A1 | 2/2005 | Yamaguchi et al. | |
| 2006/0186094 | A1 | 8/2006 | Krink et al. | |
| 2007/0181540 | A1 | 8/2007 | Lindsay | |

FOREIGN PATENT DOCUMENTS

| | | |
|---|---|---|
| JP | 05-212546 | 8/1993 |
| JP | 06-508793 | 10/1994 |
| JP | 2004-351449 | 12/2004 |
| WO | 2007/089709 | 8/2007 |
| WO | 2008/044756 | 4/2008 |

OTHER PUBLICATIONS

International Search Report for International Patent Application No. PCT/US2009/063346, dated Apr. 28, 2010.

Written Opinion of the International Searching Authority for International Patent Application No. PCT/US2009/063346, dated Apr. 28, 2010.

International Preliminary Report on Patentability for International Patent Application No. PCT/US2009/063346, dated Jun. 29, 2011.

International Search Report for International Patent Application No. PCT/US2009/061874, dated Feb. 26, 2010.

Written Opinion of the International Searching Authority for International Patent Application PCT/US2009/061874, Feb. 26, 2010.

International Preliminary Report on Patentability for International Patent Application PCT/US2009/061874, dated Jun. 29, 2011.

Communication Pursuant to Article 94(3) EPC for EP Application 09747956.2, dated Sep. 14, 2011.

"Internal Part Feature Cutting Method and Apparatus" Specification, Drawings, Claims and Prosecution History of U.S. Appl. No. 12/466,786, filed May 15, 2009, by Jon W. Lindsay.

"Method and Apparatus for Cutting High Quality Internal Features and Contours" Specification, Drawings, Claims and Prosecution History of U.S. Appl. No. 12/557,920, filed Sep. 11, 2009, by Jon W. Lindsay.

"High Quality Hole Cutting Using Variable Shield Gas Compositions" Specification, Drawings, Claims and Prosecution History of U.S. Appl. No. 12/341,731, filed Dec. 22, 2008, by Jon W. Lindsay.

* cited by examiner 27
28
33
29
37
31
35
36
32
34
30

570

| Mild Steel Process | | Lead-in Speed (as a function of hole diameter) | | | | | | | | | | | | | | |
|---|---|---|---|---|---|---|---|---|---|---|---|---|---|---|---|---|
| Current (A) | Thickness (in) | 0.276 (ipm) | 0.315 (ipm) | 0.394 (ipm) | 0.472 (ipm) | 0.571 (ipm) | 0.650 (ipm) | 0.728 (ipm) | 0.827 (ipm) | 0.945 (ipm) | 1.024 (ipm) | 1.102 (ipm) | 1.260 (ipm) | 1.496 (ipm) | 1.772 (ipm) | 2.047 (ipm) |
| 400 | 1.000 | | | | | | | | | | | | | | | |
| 400 | 0.875 | | | | | | | | | | | | | | | |
| 260 | 0.750 | | | | | | 26 | 26 | 27 | 31 | 31 | 31 | 31 | 32 | | |
| 260 | 0.625 | | | | | | | | | | | | | | | |
| 200 | 0.500 | | | 14 | 20 | 27 | 28 | 28 | 29 | 29 | 32 | | | | | |

| Mild Steel Process | | Lead-in Speed (as a function of hole diameter) | | | | | | | | | | | | | | |
|---|---|---|---|---|---|---|---|---|---|---|---|---|---|---|---|---|
| Current (A) | Thickness (in) | 0.102 (ipm) | 0.122 (ipm) | 0.142 (ipm) | 0.165 (ipm) | 0.189 (ipm) | 0.209 (ipm) | 0.228 (ipm) | 0.276 (ipm) | 0.315 (ipm) | 0.394 (ipm) | 0.472 (ipm) | 0.571 (ipm) | 0.650 (ipm) | 0.728 (ipm) | 0.827 (ipm) |
| 130 | 0.375 | | | | | | | | 12 | 19 | 26 | 27 | 32 | 33 | 35 | 38 |
| 80 | 0.250 | | | | | | | 12 | 19 | 23 | 33 | 38 | 45 | | | |
| 50 | 0.188 | | | | | | | | | | | | | | | |
| 50 | 0.135 | 18 | 19 | 21 | 27 | 30 | 30 | 30 | 30 | | | | | | | |

| Mild Steel Process | | Select Gases | | Set Preflow | | Set Cutflow | | Cut Height | Hole Speed | Initial Pierce Height | | Pierce Delay | I Ramp Time | Kerf Comp |
|---|---|---|---|---|---|---|---|---|---|---|---|---|---|---|
| Current (A) | Thickness (in) | Plasma | Shield | Plasma | Shield | Plasma | Shield | (in) | (ipm) | (in) | factor % | (s) | (ms) | (in) |
| 400 | 1.000 | O2 | O2 | 24 | 50 | 60 | | 0.16 | | 0.32 | 200 | 0.9 | 250 | |
| 400 | 0.875 | O2 | O2 | 24 | 50 | 60 | | 0.14 | | 0.28 | 200 | 0.6 | 250 | |
| 260 | 0.750 | O2 | O2 | 22 | 49 | 80 | 25 | 0.14 | 35 | 0.35 | 250 | 0.6 | 108 | 0.203 |
| 260 | 0.625 | O2 | O2 | 22 | 49 | 80 | 21 | 0.14 | 35 | 0.35 | 250 | 0.5 | 108 | 0.210 |
| 200 | 0.500 | O2 | O2 | 23 | 42 | 74 | 14 | 0.13 | 40 | 0.26 | 200 | 0.5 | 210 | 0.179 |
| 130 | 0.375 | O2 | O2 | 32 | 32 | 84 | 13 | 0.12 | 45 | 0.24 | 200 | 0.3 | 80 | 0.141 |
| 80 | 0.250 | O2 | O2 | 48 | 23 | 78 | 9 | 0.08 | 55 | 0.16 | 200 | 0.3 | 50 | 0.119 |
| 50 | 0.188 | O2 | O2 | 70 | 30 | 81 | 17 | 0.06 | 40 | 0.12 | 200 | 0.3 | 50 | |
| 50 | 0.135 | O2 | O2 | 70 | 30 | 81 | 17 | 0.06 | 40 | 0.12 | 200 | 0.2 | 50 | |

FIGURE 13

| | CONTOUR CUTTING | | HOLE CUTTING | |
|---|---|---|---|---|
| | Plasma Gas | Shield Gas | Plasma Gas | Shield Gas |
| Ignition | Air | Air | Air | Air |
| Pierce | $O_2$ | Air | $O_2$ | Air |
| Cutting | $O_2$ | Air | $O_2$ | $O_2$ |

FIGURE 18

METHOD AND APPARATUS FOR CUTTING HIGH QUALITY INTERNAL FEATURES AND CONTOURS

CROSS-REFERENCE TO RELATED APPLICATION

This application is a continuation application of and claims the benefit of U.S. patent application Ser. No. 12/557,920 filed on Sep. 11, 2009, which is a continuation-in-part of U.S. patent application Ser. No. 12/466,786 filed on May 15, 2009, and which is also a continuation-in-part of U.S. patent application Ser. No. 12/341,731 filed on Dec. 22, 2008, which applications are owned by the assignee of the instant application and the disclosures of which applications are incorporated herein by reference in their entirety. U.S. patent application Ser. No. 12/466,786 claims benefit of and priority to U.S. Provisional Patent Application No. 61/154,259 filed on Feb. 20, 2009, which is owned by the assignee of the instant application and the disclosure of which is also incorporated herein by reference in its entirety.

FIELD OF THE INVENTION

The invention relates generally to plasma arc cutting torch systems. More specifically, the invention relates to a method and apparatus for cutting internal features and contours in a workpiece using a plasma torch tip configuration.

BACKGROUND OF THE INVENTION

Plasma cutting uses a constricted electric arc to heat a gas flow to the plasma state. The energy from the high temperature plasma flow locally melts the workpiece. The energy from the high temperature plasma flow locally melts the workpiece. For many cutting processes, a secondary gas flow (also known as a shield gas flow, or shield flow) is used to protect the torch and assist the cutting process. The momentum of the high temperature plasma flow and the shield flow help remove the molten material, leaving a channel in the workpiece known as a cut kerf ("kerf").

Relative motion between the plasma torch and the workpiece allows the process to be used to effectively cut the workpiece. The shield gas interacts with the plasma gas and the surface of the workpiece and plays a critical role in the cutting process. Downstream of the nozzle orifice, the plasma and shield gas flows come into contact enabling heat and mass transfer.

FIG. 1 is a diagram of a known automated plasma torch system. Automated torch system 10 can include a cutting table 22 and torch 24. An example of a torch that can be used in an automated system is the HPR260 auto gas system, manufactured by Hypertherm, Inc., of Hanover, N.H. The torch height controller 18 can be mounted to a gantry 26. The automated system 10 can also include a drive system 20. The torch is powered by a power supply 14. The plasma arc torch system can also include a gas console 16 that can be used to regulate/configure the gas composition (e.g., gas types for the shield gas and plasma gas) and the gas flow rates for the plasma arc torch. An automated torch system 10 can also include a computer numeric controller 12 (CNC), for example, a Hypertherm Automation Voyager, manufactured by Hypertherm, Inc., Hanover, N.H. The CNC 12 can include a display screen 13 which is used by the torch operator to input or read information that the CNC 12 uses to determine operating parameters. In some embodiments, operating parameters can include cut speed, torch height, and plasma and shield gas composition. The display screen 13 can also be used by the operator to manually input operating parameters. A torch 24 can also include a torch body (not shown) and torch consumables that are mounted to the front end of a torch body. Further discussion of CNC 12 configuration can be found in U.S. Patent Publication No. 2006/0108333, assigned to Hypertherm, Inc., the disclosure of which is incorporated herein by reference in its entirety.

FIG. 2 is a cross-sectional view of a known plasma arc torch tip configuration, including consumable parts and gas flows. The electrode 27, nozzle 28, and shield 29 are nested together such that the plasma gas 30 flows between the exterior of the electrode and the interior surface of the nozzle. A plasma chamber 32 is defined between the electrode 27 and nozzle 28. A plasma arc 31 is formed in the plasma chamber 32. The plasma arc 31 exits the torch tip through a plasma nozzle orifice 33 in the front end of the nozzle to cut the workpiece 37. The shield gas 34 flows between the exterior surface of the nozzle and the interior surface of the shield. The shield gas 34 exits the torch tip through the shield exit orifice 35 in the front end of the shield, and can be configured to surround the plasma arc. In some instances, the shield gas also exits the torch tip through bleed holes 36 disposed within the shield 29. A portion of the shield gas flow can enter the cut kerf with the plasma gas and form a boundary layer between the cutting arc and the workpiece surface 37. The composition of this boundary layer influences the heat transfer from the arc to the workpiece surface and the chemical reactions that occur at the workpiece surface. An example of plasma torch consumables are the consumable parts manufactured by Hypertherm, Inc., of Hanover, N.H. for HPR 130 systems, for cutting mild steel with a current of 80 amps. The nozzle 28 can be a vented nozzle, (e.g., comprising an inner and outer nozzle piece and a bypass channel formed between the inner and outer nozzle pieces directs the bypass flow to atmosphere), as described in U.S. Pat. No. 5,317,126 entitled "Nozzle And Method Of Operation For A Plasma Arc Torch" issued to Couch et al., which is owned by the assignee of the instant application and the disclosure of which is incorporated herein by reference in its entirety.

Internal features (e.g., hole features, substantially circular holes, slots, etc.) cut with plasma arc torches using known methods can result in defects, such as, for example, protrusions, divots, "bevel" or "taper." Bevel or taper is where a feature size at a bottom side of the workpiece is smaller than the feature size at the top side of the plate. For example, the diameter of an internal feature (e.g., a hole/hole feature) at the top of the workpiece should be cut to match the size of a bolt to pass through the internal feature. If a hole feature has defects, such as, protrusions, divots, bevel or taper, the defects in the hole feature can cause the hole feature diameter to vary from the top of a workpiece to the bottom of the workpiece. Such defects can prevent the bolt from passing through the bottom of the workpiece. Secondary processes, such are reaming or drilling are required to enlarge the diameter of the bolt hole feature at the bottom of the workpiece. This prior method of ensuring hole cut quality can be time consuming, suggesting that a more efficient method of cutting holes and contours in a single workpiece is needed.

Numerous gas mixtures can be used for both plasma and shield gas in plasma cutting processes. For example, oxygen is used as the plasma gas and air as the shield gas for the processing of mild steel. Some low current processes (e.g., less than 65 A) use oxygen as both the plasma gas and shield gas to cut thin material (e.g., workpieces less than 10 gauge). The oxygen plasma gas/air shield gas combination is popular for mild steel at arc currents above 50 amps, due to the ability to produce large parts with good quality and minimal dross at high cutting speeds. Such cutting processes have certain drawbacks. For example, though the oxygen plasma gas/air shield gas configuration can cleanly cut large sections with straight edges (e.g., contours), such a gas combination is unable to cut high quality hole features. Instead, hole features cut with oxygen plasma gas and air shield gas has a substantial bevel or "taper".

Traditionally, to correct defects in the hole feature, such as, for example, a "protrusion" (e.g., excess material) where the lead-in of a cut transitions into a perimeter of the cut, the arc is left on after cutting the perimeter to "clean up" the defect left by the lead-in by cutting the unwanted excess material. This process is called "over burn." Over burning, however, can result in removing too much material, leaving an even larger defect (e.g., leaving a divot in place of the protrusion).

SUMMARY OF THE INVENTION

The present invention substantially improves the cut quality for small internal part features (e.g., hole features) cut from a workpiece using a plasma arc torch while maintaining the productivity and cut quality for large features, or contours. Hole features (e.g., holes) cut using plasma arc torches using known methods can result in defects, such as protrusions (e.g., where not enough material was cut, leaving excess material), divots (e.g., where too much material was cut), bevel and/or taper, which can prevent, for example, a bolt from passing through the bottom of a workpiece. Cutting parameters (e.g., gas composition, cutting speed, cutting current, etc.) can be manipulated to improve the cut quality of a small internal part feature while still maintaining quality for large features or contours. The shield gas composition can affect the taper, or bevel, of the edge of a hole cut that is being performed. For example, a first shield gas composition can be used when cutting the contour, and a second, different, shield gas composition can be used when cutting one or more holes or small internal feature in a single workpiece while using a single plasma torch consumable configuration.

The cutting speed of the "lead-in" of the cut can affect the cut quality for the hole feature. Using the same speed for the lead-in of the cut as the rest of the cut can result in defects such as protrusions, where the lead of the cut transitions into the perimeter. As noted above, traditionally, an "over burn" process can be used to remove the excess material; however, an over burn process can remove too much material, leaving behind a defect, such as a divot. Using a low $N_2$ gas composition (e.g., a gas composition of $O_2$ plasma gas and $O_2$ shield gas) can also be used to cut small internal features to help minimize the bevel and/or taper. Cutting a workpiece using, for example air, is not as sensitive to defects as cutting with $O_2$ gas. Using $O_2$ plasma and $O_2$ shield gas can further amplify defects such as protrusions and/or divots in the hole feature. By changing the shield gas composition when cutting a hole and when cutting a contour in a single workpiece, the need for secondary processes can be eliminated. While laser cutting systems can yield high quality cuts, plasma arc torch systems provide a low cost alternative to cutting internal features (e.g., hole features).

In one aspect, the invention features an automated method for cutting a plurality of hole features using a plasma arc torch system, the automated method implemented on a computer numerical controller. The automated method can include the following steps: a) cutting a lead-in for a hole feature using a lead-in command speed based on a diameter of that hole feature and b) cutting a perimeter for the hole feature using a perimeter command speed greater than the corresponding lead-in command speed for the hole feature. The automated method can also include step c) of repeating steps a) and b) for each additional hole feature having a same diameter or a different diameter.

In some embodiments, the automated method can include cutting a contour using a secondary gas composition having a higher nitrogen content than the secondary gas composition used to cut the plurality of hole features.

In another aspect, the invention features an automated method for cutting a plurality of hole features in a workpiece with a plasma arc torch, each hole feature including a lead-in portion, a hole perimeter portion, and a lead-out portion. The method can include cutting a first hole feature in a workpiece having a first diameter by cutting a first lead-in using a first command speed and increasing a command speed from the first command speed to a second command speed after cutting the first lead-in to cut at least a portion of the first hole perimeter. The method can also include cutting a second hole feature in the workpiece having a second diameter greater than the first diameter by cutting a second lead-in using a third command speed, the third command speed greater than the first command speed and increasing the command speed from the third command speed to a fourth command speed after cutting the second lead-in to cut at least a portion of the second hole perimeter.

In some embodiments, the fourth command speed and the second command speed are substantially the same. The automated method can also include the steps of cutting the first hole feature in the workpiece using a first secondary gas flow, cutting the second hole feature in the workpiece using a second secondary gas flow and cutting a contour in the workpiece using a third secondary gas flow having a higher nitrogen content than the first secondary gas flow or the second secondary gas flow. In some embodiments, the first secondary gas flow and the second secondary gas flow have substantially the same gas composition.

In another aspect, the invention features an automated method for cutting a plurality of hole features in a workpiece with a plasma arc torch. The automated method can include cutting a first hole feature having a first diameter using a first automated process by initiating a secondary gas flow having a first gas composition and cutting the first hole feature with a first set of cutting parameters. The automated method also can include cutting a second hole feature having a second diameter greater than the first diameter using a second automated process by initiating the secondary gas flow having a second gas composition and cutting the second hole feature with a second set of cutting parameters, where at least one parameter of the second set of cutting parameters is different from the first set of cutting parameters. The automated method can also include cutting a contour using a third automated process by initiating the secondary gas flow having a third gas composition, the third gas composition having a greater nitrogen content than the first and second gas compositions and cutting the contour with a third set of cutting parameters, where at least one parameter of the third set of cutting parameters is different from the first or second set of cutting parameters.

The first set of cutting parameters can include a first lead-in command speed, a first perimeter command speed and the first gas composition. The second set of cutting parameters can include a second lead-in command speed, a second perimeter command speed, and the second gas composition. The third set of cutting parameters can include a contour command speed and the third gas composition. The contour command speed can be greater than the first lead-in command speed, the first perimeter command speed, the second lead-in command speed and the second perimeter command speed. The first gas composition and the second gas composition can be substantially the same (e.g., the same).

In another aspect, the invention features an automated method for cutting at least a first hole feature and a second hole feature in a workpiece with a plasma arc torch, the second hole feature larger than the first hole feature. The method can include moving the plasma arc torch to a first location and cutting the first hole feature in the workpiece by cutting a first lead-in by ramping up a cutting speed up to a first lead-in cutting speed, increasing the cutting speed after the first lead-in to cut a first perimeter, initiating current ramp down after an inner kerf edge of the first perimeter substantially intersects an outer kerf edge of the first lead-in and maintaining or increasing the cutting speed until a cutting current is extinguished, the cutting current extinguished at or near where an outer kerf edge of the first lead-in substantially joins an outer kerf edge of the first perimeter. The method can also include moving the plasma arc torch to a second location and cutting the second hole feature in the workpiece by cutting a second lead-in by ramping up the cutting speed up to a second lead-in cut speed, the second lead-in speed greater than the first lead-in cut speed, increasing the cutting speed after the second lead-in to cut a second perimeter, initiating current ramp down after an inner kerf edge of the second perimeter substantially intersects an outer kerf edge of the second lead-in and maintaining or increasing the cutting speed until the cutting current is extinguished, the cutting current extinguished at or near where an outer kerf edge of the second lead-in joins an outer kerf edge of the second perimeter.

In some embodiments, current ramp down can be initiated while cutting the first hole feature or the second hole feature at a point based on a diameter of the first hole feature or the second hole feature.

In another aspect, the invention features a plasma arc torch system configured to cut contours and a plurality of hole features of varying sizes in a plurality of workpieces of varying thicknesses. The system can include a plasma arc torch having an electrode and a nozzle for a corresponding current level and a computer numerical controller (CNC). The CNC can be configured to select, from a plurality of gas compositions, a first secondary gas composition used to cut hole features and a second secondary gas composition used to cut contours. The CNC can also select, from a plurality of perimeter cutting speeds, a perimeter cutting speed based on a material thickness of a workpiece. The CNC can select, from a plurality of lead-in speeds, a lead-in speed based on a size of a hole feature to be cut and the material thickness of the workpiece, each perimeter cutting speed greater than each corresponding lead-in speed.

The lead-in speed can be proportional to the size of the hole feature to be cut. The computer numerical controller can be configured to select, from a plurality of negative time offset values, a negative time offset value based on the current level. The negative time offset can be based on the size of the hole feature to be cut or the current level.

In yet another aspect, the invention features a computer readable product, tangibly embodied on an information carrier, and operable on a computer numeric controller for cutting a plurality of hole features in a workpiece with a plasma arc torch system. The computer readable product can include instructions being operable to cause the computer numeric controller to select a shield gas composition having a nitrogen content lower than air, establish a lead-in cutting speed for a hole feature to be cut, the lead-in cutting speed a function of a diameter of the hole feature to be cut, establish a perimeter cutting speed for the hole feature to be cut, the perimeter cutting speed greater than the corresponding lead-in cutting speed and provide a first command to extinguish a plasma arc, the first command independent of a second command to decelerate a plasma arc torch.

The perimeter cutting speed can be based on a thickness of the workpiece.

In another aspect, the invention features an automated method for controlling a plasma arc torch when cutting a hole feature in a workpiece. The method can include establishing a first command to extinguish a plasma arc at a first location along a cut, the first command independent of a second command to vary a motion of the plasma arc torch and establishing a negative time offset associated with the first command that determines initiation of a current ramp down at a second location that precedes the first location along the cut.

The first location can correspond to an intersection between an outer kerf edge of a perimeter of the hole feature and an outer kerf edge of a lead-in of the hole feature. Varying the motion of the plasma arc torch can include decelerating or accelerating the plasma arc torch. The negative time offset can be the sum of a delay between the first command and initiation of the current ramp down and a time between initiation of the current ramp down and extinguishment of the plasma arc. In some embodiments, a negative time offset is retrieved from a cut chart. The negative time offset can be a function of a diameter of the hole feature or a current level.

In yet another aspect, the invention features an automated method for establishing cutting parameters for cutting a plurality of hole features having a plurality of hole diameters using a plasma arc torch. The method can include establishing a first location corresponding to where an outer kerf edge of a cut along a perimeter of each hole feature substantially joins the outer kerf edge of the cut along a lead-in of each hole feature. The method can also include establishing a second location preceding the first location based on a hole diameter of the hole feature being cut or a cutting current level and initiating plasma arc termination at the second location such that the plasma arc is substantially extinguished when the plasma arc torch reaches the first location.

In some embodiments, the plurality of hole features are cut in a workpiece with a given thickness and a distance traveled by the plasma arc torch between the second location and the first location is substantially similar for the plurality of hole features. The automated method can also include determining a negative time offset based on the hole diameter of the hole feature being cut, the negative time offset determining initiation of plasma arc termination at the second location. The plurality of hole features having the plurality of hole diameters can be cut using one set of consumables for the plasma arc torch (e.g., automated process to cut the hole features without changing the consumables in the plasma torch). In some embodiments, the workpiece can be pierced to begin cutting each hole feature.

In one aspect, the invention features a method for cutting an internal feature, such as a hole feature, in a workpiece using a plasma arc torch. The plasma arc torch can be used to cut along a portion of a path including a first zone, a second zone, and a third zone using a plasma cutting system. The method can include cutting in the first zone using at least one cutting parameter from a first cutting parameter set, the first cutting parameter set including a first cutting current and/or a first command speed establishing a first torch speed. The method can also include cutting in the second zone using at least one cutting parameter from a second cutting parameter set. The second cutting parameter set can be different from (e.g., where at least one parameter in the set is different) the first cutting parameter set and can include a second cutting current and/or a second command speed establishing a second torch speed. The method can also include cutting in the third zone using at least one cutting parameter from a third cutting parameter set. The third cutting parameter set can be different from the first cutting parameter set or the second cutting parameter set and can include a third cutting current and/or a third command speed establishing a third torch speed.

The command speed can be a set point for a torch/cutting speed. The torch speed can be the command speed offset by an acceleration/deceleration of the torch to reach the command speed setpoint and inefficiencies/limitations inherent in the plasma arc torch system.

In some embodiments, the first zone corresponds to a lead-in of a cut, the second zone corresponds to a perimeter of the cut, and the third zone corresponds to a kerf break-in region of the cut. The hole feature can be defined, at least in part, by an outer kerf edge of a cut in the second zone and at least a portion of an outer kerf edge of a cut in the third zone. Cutting in the first zone can include cutting a semi-circle in the workpiece.

The second command speed can be greater than the first command speed. In some embodiments, the third cutting current is less than the second cutting current during at least a portion of the third zone.

In one aspect, the invention features a method for cutting an internal feature, such as a hole feature, in a workpiece along at least a portion of a path including a first zone and a second zone using a plasma cutting system. The method can include the steps of initiating a plasma gas flow, initiating a current flow to ignite a pilot arc, transferring the arc to the workpiece and piercing the workpiece (e.g., to begin cutting an internal feature in the workpiece). The method can include cutting in the first zone using a first command speed establishing a first torch speed and cutting in the second zone using a second command speed establishing a second torch speed. The second command speed can be greater than the first command speed.

The internal feature (e.g., hole feature) can be a substantially circular hole or a slot.

The path can include a third zone. The first zone can correspond to a lead-in of a cut, the second zone can correspond to a perimeter of the cut, and the third zone can correspond to a kerf break-in region of the cut. The method can also include ramping down a cutting current in the third zone such that the cutting current reaching substantially zero amperes at a location corresponding to a beginning of the second zone where the first zone, second zone and third zone substantially intersect. The cutting current can be ramped down at a rate based, at least in part, upon a length between a beginning of the third zone and the beginning of the second zone.

The first command speed can be based at least in part on a diameter of the hole feature. The torch speed can be reduced after the cutting current reaches substantially zero amperes. A third command speed can be used, for example, to cut in the third zone. The third command speed can define a third torch speed. A ramp down of the cutting current can be initiated at a location in the third zone determined by the third torch speed and a ramp down time (e.g., the time required for the current to reach substantially zero amperes).

The method can include cutting in the first zone or in the second zone using a gas flow composition comprising O2 plasma gas and O2 shield gas.

In another aspect, the invention features a method for cutting an internal feature (e.g., a hole feature) in a workpiece along at least a portion of a path including a first zone, a second zone, and a third zone using a plasma cutting system. The method can include the steps of initiating a plasma gas flow, initiating a current flow to ignite a pilot arc, transferring the arc to the workpiece and piercing the workpiece (e.g., to begin cutting an internal feature/hole feature in the workpiece). The method can include cutting in a first zone and a second zone. The command speed of a cut for the second zone can be different than a command speed of a cut in the first zone. The method can also include reducing a cutting current in the third zone such that the cutting current reaches substantially zero amperes at a point where an outer kerf edge of a cut in the third zone substantially meets an outer kerf edge of the cut in the first zone. The method can also include decelerating a torch speed of the plasma cutting system after the cutting current has reached substantially zero amperes.

In some embodiments, the method can include cutting in the second zone with a command speed greater than the command speed of the cut in the first zone.

A distance from a center of the hole feature to an outer kerf edge of the cut in the second zone can be substantially similar to a distance from the center of the hole feature to an outer kerf edge of the cut in the third zone at a point where the first and third zone intersect. The hole feature can be substantially defined by an outer kerf edge of the cut in the second zone and at least a portion of the outer kerf edge of the cut in the third zone. In some embodiments, the first zone corresponds to a lead-in of the cut, the second zone corresponds to a perimeter of the cut and the third zone corresponds to a kerf break-in region of the cut.

The torch speed can be decelerated after a point where the outer kerf edge of the cut in the first zone substantially intersects with the outer kerf edge of the cut in the third zone. The torch speed can be decelerated to reach zero at a predetermined distance after the point where the outer kerf edge of the cut in the first zone substantially intersects with the outer kerf edge of the cut in the third zone.

In some embodiments, the cutting current in the third zone can be ramped down such that the cutting current reaches substantially zero amperes at a location where an outer kerf edge of the cut in the first zone substantially intersects with an outer kerf edge of the cut in the third zone.

In another aspect, the invention features a method for cutting an internal feature (e.g., a hole feature) in a workpiece along at least a portion of a path including a first zone, a second zone, and a third zone and using a plasma cutting system. The method can include the steps of initiating a plasma gas flow, initiating a current flow to ignite a pilot arc, transferring the arc to the workpiece and piercing the workpiece (e.g., to begin cutting an internal feature/hole feature in the workpiece). The method can include cutting in the second zone with a command speed different from a command speed of the first zone of the cut. The method can also include ramping down a cutting current in the third zone to remove a diminishing material such that an outer kerf edge of a cut in the third zone substantially aligns with an outer kerf edge of a cut in the second zone. The method can include decelerating a torch speed of the plasma cutting system after the cutting current has reached substantially zero amperes.

In some embodiments, the cutting current can be ramped down in the third zone so that the cutting current reaches substantially zero amperes where the outer kerf edge of the cut in the third zone intersects with the outer kerf edge of a cut in the first zone. The diminishing material can be defined at least in part by an outer kerf edge of the cut in the first zone and an outer kerf edge of the cut in the third zone. In some embodiments, the third zone can be cut with a command speed greater than the command speed of the second zone of the cut.

In yet another aspect, the invention features a method for cutting an internal feature (e.g., a hole feature) in a workpiece using a plasma cutting system that reduces defects in the hole feature. The method can include the steps of initiating a plasma gas flow, initiating a current flow to ignite a pilot arc, transferring the arc to the workpiece and piercing the workpiece at the beginning of a cut (e.g., to cut an internal feature/hole feature in the workpiece). The method can include establishing a cutting arc and a cut speed with respect to the workpiece and increasing the cut speed to a second cut speed after a first point in a hole cut path. The method can also include ramping down a cutting current after a second point in the hole cut path without reducing the cut speed. The second cut speed can be maintained until the cutting current reaches substantially zero amperes. The second cut speed can also be increased to a third cut speed before the cutting current reaches substantially zero amperes.

The first zone can define a lead-in of a cut and the second zone can define at least a portion of a perimeter of the hole feature.

In some embodiments, the step of increasing the cut speed can include cutting in a first zone of the hole cut path with a first command speed and cutting in a second zone of the hole cut path with a second command speed greater than the first command speed. The first command speed can be based on a diameter of the hole feature.

The cutting current can be reduced (i.e., ramp down of the cutting current initiated) after the second point in the hole cut path and the cutting arc can be extinguished substantially near the first point in the hole cut path. In some embodiments, the torch can cut from the second point in the hole cut path and return back to the first point in the hole cut path to form the hole feature in the workpiece. The cutting current can be ramped down while cutting from the second point in the hole cut path back to the first point in the hole cut path.

In another aspect, the invention features a plasma arc torch system for cutting an internal feature (e.g., a hole feature) in a workpiece along at least a portion of a path including a first zone, a second zone, and a third zone. The plasma arc torch system can include a plasma torch including an electrode and a nozzle, a lead that provides a cutting current to the plasma arc torch, a gantry attached to the plasma torch that moves the plasma torch and a computer numerical controller that controls cutting parameters of the plasma arc torch in the first zone, the second zone, and the third zone. The computer numerical controller can establish a first command speed for the first zone and a second command speed for the second zone. The first command speed can be based, at least part, on a diameter of the hole feature. The second command speed can be greater than the first command speed. The computer numerical controller can also establish a third cutting current for the third zone. The third cutting current can ramp down so that the third cutting current reaches substantially zero amperes where an outer kerf edge of a cut in the first zone substantially intersects with an outer kerf edge of a cut in the third zone.

The computer numerical controller can include a look-up table to identify the cutting parameters of the plasma arc torch.

The third cutting current can ramp down to remove a diminishing material (e.g., the remaining material of the workpiece to finish cutting the hole feature) so that an outer kerf edge of the cut in the third zone substantially aligns with an outer kerf edge of a cut in the second zone.

In yet another aspect, the invention features a computer readable product, tangibly embodied on an information carrier, and operable on a computer numeric controller for a plasma arc torch cutting system. The computer readable product can include instructions being operable to cause the computer numeric controller to select cutting parameters for cutting an internal feature (e.g., a hole feature) in a workpiece along at least a portion of a path comprising a first zone, a second zone, and a third zone. The cutting parameters can include a first command speed for the first zone based, at least part, on a diameter of the hole feature and a second command speed for the second zone of the cut. The second command speed can be greater than the first command speed. The cutting parameters can also include a third cutting current for the third zone, where the third cutting current ramps down such that the third cutting current reaches substantially zero amperes where an outer kerf edge of a cut in the first zone substantially intersects with an outer kerf edge of a cut in the third zone.

The third cutting current can ramp down to remove a diminishing material (e.g., the remaining material of the workpiece to finish cutting the hole feature) so that an outer kerf edge of the cut in the third zone substantially aligns with an outer kerf edge of a cut in the second zone.

In another aspect, the invention features a method for cutting an internal feature (e.g., a hole feature) in a workpiece using a plasma arc torch to reduce defects in the hole feature. The plasma arc torch can cut along at least a portion of a path including a first zone, a second zone and a third zone. The method can include selecting one of a plurality of cutting current ramp down operations for cutting in the third zone, where each of the plurality of cutting current ramp down operations is a function of a diameter of the hole feature. The method can also include extinguishing the plasma cutting current when a torch head passes from the third zone to the second zone at a location where the first zone, second zone and third zone substantially intersect. The method can also include substantially maintaining or increasing a torch speed in the third zone until the torch head passes from the third zone into the second zone.

In another aspect, the invention features a method for cutting an internal feature (e.g., a hole feature) in a workpiece using a plasma arc torch to reduce defects in the hole feature. The plasma arc torch can cut along at least a portion of a path including a first zone, a second zone and a third zone. The method can include the steps of initiating a plasma gas flow, initiating a current flow to ignite a pilot arc, transferring the arc to the workpiece and piercing the workpiece (e.g., to begin cutting an internal feature/hole feature in the workpiece). The method can include cutting alone the first zone and the second zone of the path. A ramp down of a cutting current can be initiated at a first point in the third zone such that the cutting current is extinguished at a second point where the first zone, the second zone and the third zone substantially intersect. The first point in the third zone can be determined based on a ramp down time of the cutting current. The method can also include the step of decelerating the plasma arc torch so that a torch speed reaches substantially zero at a predetermined distance after the second point.

In some embodiments, the predetermined distance is about ¼ of an inch. In some embodiments, the predetermined distance is about ¼ of an inch where an upper limit of the hole cutting speed is about 55 ipm and a lower limit for a table acceleration is about 5 mG.

In another aspect, the invention features a method for cutting a hole feature in a workpiece along at least a portion of a path using a plasma cutting system. The path can include a first zone and a second zone. The method can include the steps of initiating a plasma gas flow, initiating a current flow to ignite a pilot arc, transferring the arc to the workpiece and piercing the workpiece (e.g., to begin cutting an internal feature/hole feature in the workpiece). The method can include cutting in the first zone using a first command speed (e.g., establishing a first torch speed), where the first command speed is part of an acceleration curve (e.g., programmed for a plasma arc torch system). The method can include cutting in the second zone using a second command speed (e.g., establishing a second torch speed), where the second command speed is part of the acceleration curve and is also greater than the first command speed.

In yet another aspect, the invention features a method for cutting a hole feature in a workpiece along at least a portion of a path using a plasma cutting system. The path can include a first zone and a second zone. The method can include the steps of initiating a plasma gas flow, initiating a current flow to ignite a pilot arc, transferring the arc to the workpiece and piercing the workpiece (e.g., to begin cutting an internal feature/hole feature in the workpiece). The method can include cutting where the first zone and the second zone substantially intersect (e.g., where the lead-in of the cut transitions into the perimeter of the cut) at a first torch speed. The method can also include cutting at least a portion of the second zone at a second torch speed, where the second torch speed is greater than the first torch speed.

In one aspect, the invention features a method for cutting a hole and a contour in a workpiece with a plasma torch. In one embodiment the method includes a plasma torch including a nozzle and electrode that define a plasma chamber; a plasma arc is generated in the plasma chamber. In one embodiment, the plasma torch also includes a shield gas supply line for providing a shield gas flow to the plasma arc torch, and a control unit for controlling cutting parameters including cutting speed and shield gas composition. In one embodiment the method includes controlling the cutting parameters such that when the contour is cut the shield gas comprises a first shield gas composition and when the hole is cut the shield gas comprises a second shield gas composition. In some embodiments, the first shield gas composition is different than the second shield gas composition.

In still another aspect the invention features a method for improving the cutting characteristics of a small internal feature in a plasma torch cutting operation. In one embodiment the method includes the steps of cutting a small internal feature using a second shield gas composition, the small internal feature positioned within the anticipated contour cut of a workpiece, and cutting a contour corresponding to the anticipated contour cut using a first shield gas composition.

In a further aspect the invention features a method for cutting a hole and a contour in a workpiece using a plasma arc torch. The plasma arc torch can include a nozzle and electrode that define a plasma chamber, such that a plasma arc generated in the plasma chamber is used to cut the workpiece, and a shield gas supply line that delivers a shield gas flow to the plasma torch. In one embodiment, the method includes the step of cutting a hole in a workpiece wherein the shield gas flow comprises a second shield gas composition which is selected such that a bevel of an edge of the hole is substantially eliminated. In one embodiment the method can also include the steps of cutting a contour wherein the shield gas flow comprises a first shield gas composition, and controlling the first shield gas composition and the second shield gas composition such that while cutting the hole the second shield gas composition comprises less nitrogen than the first shield gas composition.

In another aspect, the invention features a further method of cutting a hole in a workpiece using a plasma arc torch. The method can include a plasma arc torch including high-current consumables, the high-current consumables including a nozzle and electrode that define a plasma chamber. In one embodiment the method can also include the steps of generating a plasma arc in the plasma chamber using an arc current above 50 amps, and controlling a shield gas composition of a shield gas flow such that when the hole is being cut the shield gas composition comprises an amount of nitrogen such that any potential bevel of the side wall of the hole is substantially eliminated.

The invention features, in one aspect, a plasma torch system for cutting a hole and contour in a workpiece. In one embodiment the plasma torch system includes a plasma torch tip configuration including a nozzle and an electrode that defines a plasma chamber, a plasma arc is generated in the plasma chamber. In one embodiment the plasma torch system also includes a shield gas supply line for providing a shield gas flow to the plasma torch tip and a control unit for controlling a composition of the shield gas flow. In one embodiment the control unit controls the composition of the shield gas flow such that while cutting the contour the shield gas flow comprises a first shield gas composition and while cutting the hole the shield gas flow comprises a second shield gas composition. In one embodiment the improvement comprises a computer readable product tangibly embodied in an information carrier, operable on the control unit, the computer readable product containing cutting information for the plasma arc torch system including instructions that select the first shield gas composition when cutting the contour and select the second shield gas composition when cutting the hole.

In another aspect, the invention features a component that includes a computer readable product tangibly embodied in an information carrier, operable on a CNC for use in a plasma torch system. In one embodiment the computer readable product includes cutting information for cutting a hole and a contour from a workpiece using a plasma arc torch, including instructions such that while cutting the hole a shield gas flow comprises a second shield gas composition and when the contour is cut the shield gas flow comprises a first shield gas composition.

In still another aspect, the invention features a computer numerical controller for controlling cutting parameters of a plasma torch including a composition of a shield gas flow. In one embodiment the controller includes a processor, an electronic storage device, an interface for providing control instructions to a plasma arc torch, and a look up table for selecting the composition of the shield gas flow for the plasma torch. In one embodiment the controller controls the composition of the shield gas flow according to whether the plasma torch will cut a hole or a contour in a workpiece.

Any of the aspects above can include one or more of the following features. The second shield gas composition can comprise less nitrogen than the first shield gas composition such that a bevel of an edge of the hole is substantially eliminated. In some embodiments the workpiece is mild steel, in some embodiments the first shield gas composition is air, and in some embodiments the second shield gas composition is oxygen. The second shield gas composition can also consist essentially of oxygen during hole cutting. In one embodiment a flow rate of the shield gas flow is reduced during hole cutting. A cutting speed of the torch can be reduced during hole cutting. In one embodiment, controlling the cutting parameters can further comprise controlling the second shield gas composition according to a ratio of a diameter of the hole to a thickness of the workpiece. The ratio can be less than or equal to 2.5. In some embodiments the ratio is less than or equal to 1. In some embodiments the ratio is less than or equal to 0.7 and/or limited by the size of the pierce penetration.

Any of the aspects above can also include one or more of the following features. In one embodiment controlling the cutting parameters can include current ramping sequences for arc termination where the ramping is constant for both contour cutting and hole cutting. The step of controlling the cutting parameters can also further comprise controlling an amount of nitrogen in the shield gas flow such that the second shield gas composition contained less nitrogen as a percentage of the total volume than the first shield gas composition whereby a bevel of an edge of the hole is substantially reduced.

Any of the aspects above can also include one or more of the following features. In one embodiment a method can include the step of providing a computer readable product tangibly embodied in an information carrier, operable on a CNC for use with a plasma torch system, the computer readable product containing cutting information for the plasma arc torch including instructions that select the first shield gas composition when cutting the contour and select the second shield gas composition when cutting the hole. In some embodiments the second shield gas composition can be selected according to a ratio of the diameter of the hole to the thickness of a workpiece. And in some embodiments the cutting information include instructions such that when a hole is cut the control unit controls the second shield gas composition according to a ratio of a diameter of the hole to a thickness of the workpiece.

One advantage is the capability to produce high quality plasma cut holes, while maintaining productivity and dross levels typically achieved on contour cuts. Another advantage is the minimization of impact on overall part cost by limiting the use of more expensive shield gas mixtures to short duration hole cuts. A further advantage is greater time efficiency by allowing the operator to use a single configuration of torch consumables when cutting holes and contours in a single workpiece, while simultaneously preventing the quality deterioration seen when using the prior cutting technique of a single shield gas for both hole and contour cutting.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 10 is an exemplary look-up chart for lead-in command speeds, according to an illustrative embodiment of the invention.

FIG. 13 is an exemplary look-up chart for cutting parameters, according to an illustrative embodiment of the invention.

FIG. 18 is a table illustrating different gas combinations for cutting mild steel, according to an illustrative embodiment of the invention.

DETAILED DESCRIPTION OF THE INVENTION

Figure 3:
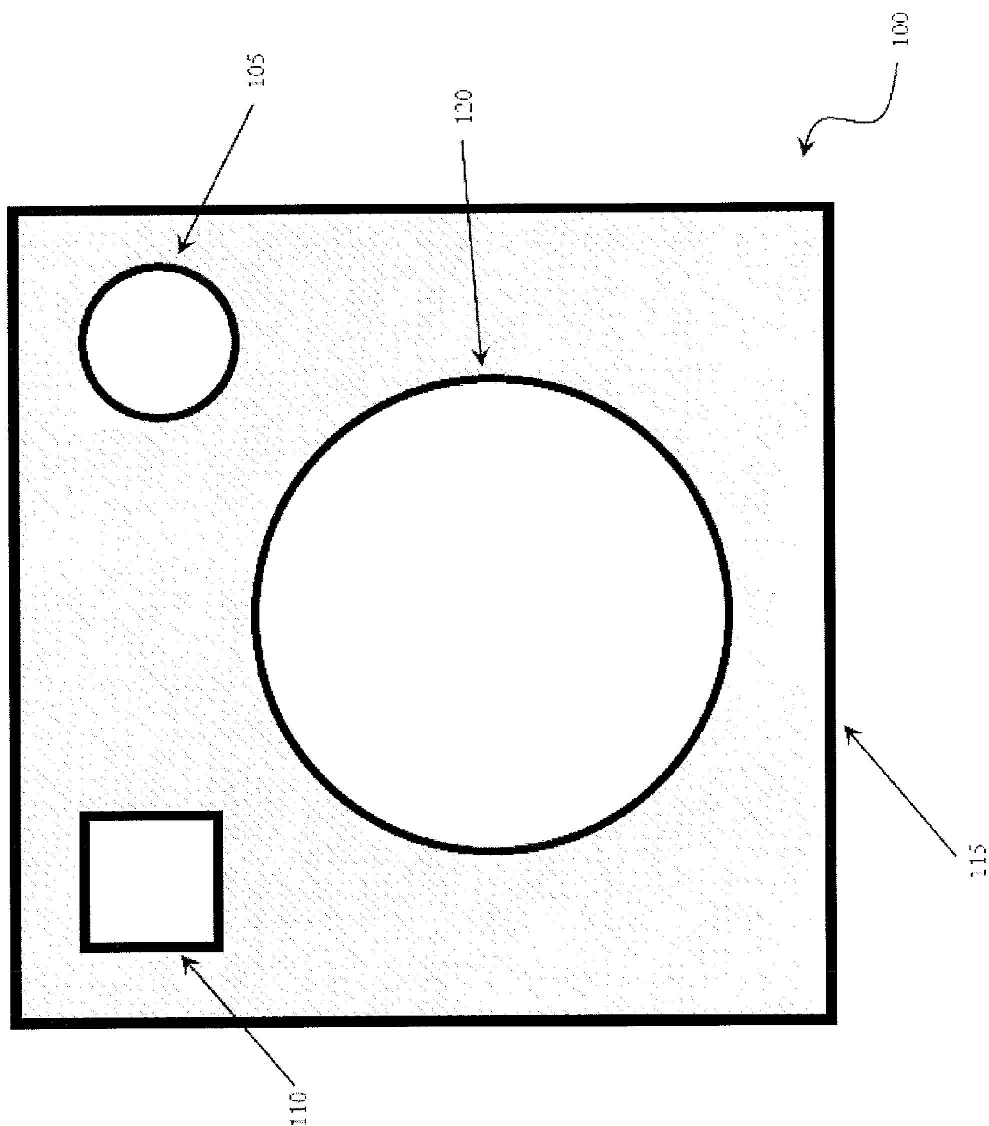
FIG. 3 is a sample workpiece showing anticipated hole and contour cut outlines, according to an illustrative embodiment.

A "hole feature" (e.g., hole) can be defined as a shape having a diameter (or dimension) to workpiece (plate) thickness ratio of approximately 2.5 or smaller. FIG. 3, by way of example, shows a 6×6 inch square piece of 0.5 inch thick plate steel 100 that in one embodiment, could be cut from a larger workpiece (not shown). A one inch diameter hole feature 105 in the 0.5 inch thick plate of steel 100 would have a ratio of 2. A hole/hole feature, as used herein, can be categorized as a small internal part features that are not necessarily round, but where a majority of the features have dimension that are about 2.5 times or less than the thickness of the materials (e.g., a 1 inch square 110 in the ½ inch plate steel 100). Features such as "contours" can include both straight 115 or curved 120 cuts.

Figure 4:
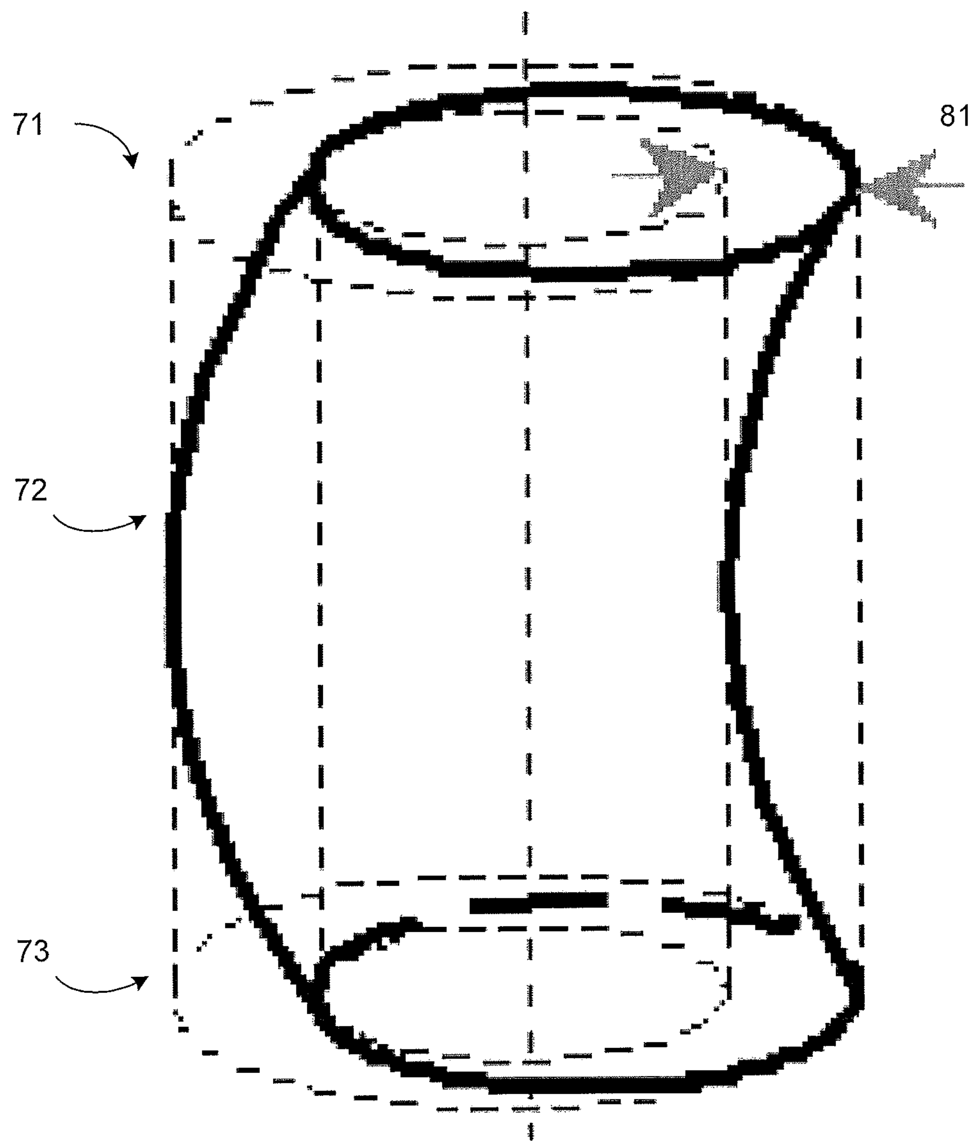
FIG. 4 is an illustration of tolerance measurements used to determine cylindricity of a hole.

As noted above, hole features cut using prior art methods can result in defects, such as divots (e.g., too much material taken), protrusions (e.g., not enough material taken), "bevel" or "taper". Bevel can be measured by the cylindricity of the completed hole cut. Cylindricity is defined as a tolerance zone that is established by two concentric cylinders between which the surface of a cylindrical hole must lie as illustrated in FIG. 4. In FIG. 4 the tolerance zone can be defined as the space between the two arrows 81. The smaller the tolerance zone, the more the surface represents a "perfect" cylinder. A large taper or bevel in a hole feature, on the other hand, will result in a large tolerance zone. Cylindricity of a hole feature can also be measured using a coordinate-measuring machine ("CMM"). For example, the hole feature surface (e.g., encompassing taper, protrusions, or divots) of the hole feature can be measured near of the top 71, middle 72, and bottom 73 of the edge 74 of the hole feature. This measurement data is used to form concentric cylinders defining the cylindricity of the hole feature. The radial difference between the concentric cylinders is illustrated by the space between the arrows 81.

Figure 5:
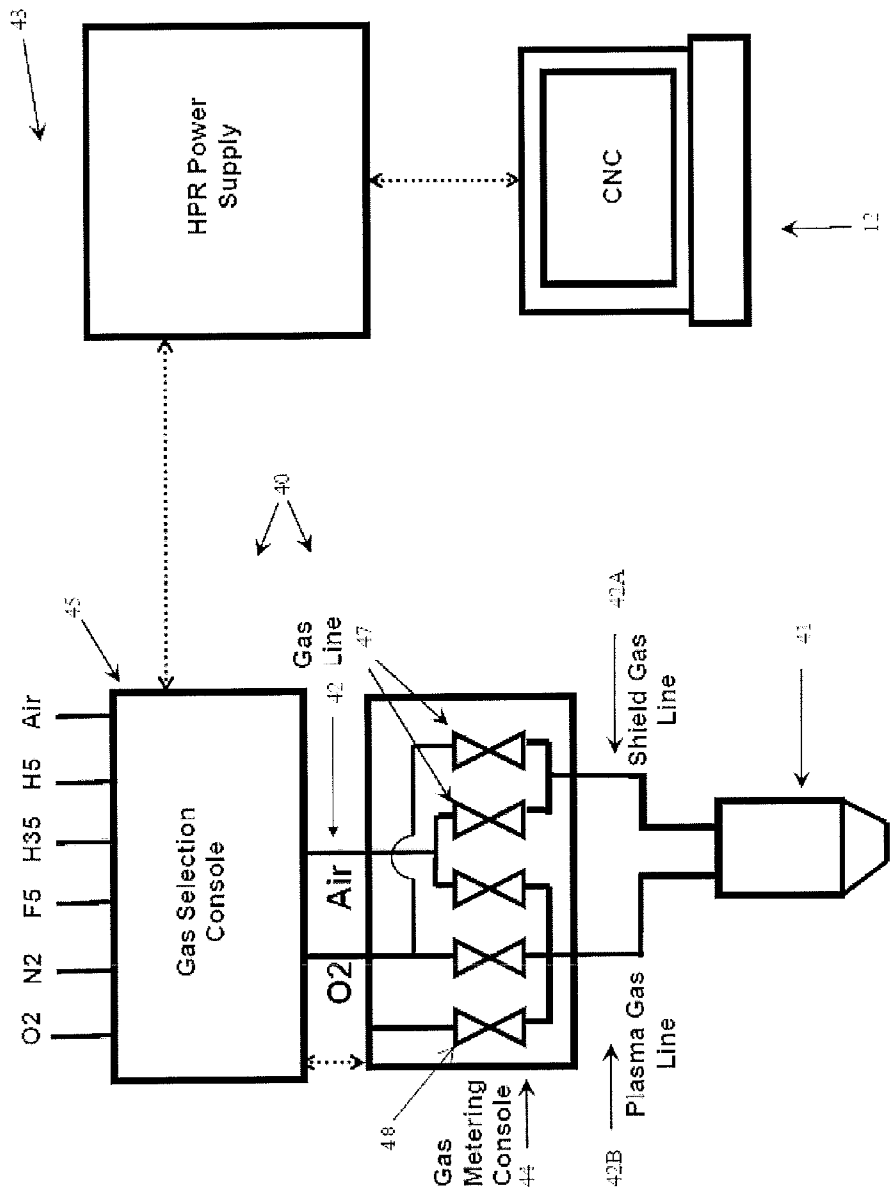
FIG. 5 is a block diagram of a plasma arc torch system with a proposed gas system, according to an illustrative embodiment.

An exemplary torch system configuration that can be used to cut features (e.g., hole features, contours, etc.) is shown in FIG. 5. FIG. 5 is a block diagram of an exemplary plasma arc torch system including an automatic gas control system according to an embodiment of the invention. The plasma torch system can include all of the elements described above in connection with FIG. 1. Additionally, the torch system can include a gas console 40 that provides plasma and shield gas (e.g., secondary gas) to the plasma arc torch 41. The plasma gas and the shield gas flows from the gas console 40 through gas supply lines 42 to, in some embodiments, a gas selection consol 45 and a gas metering consol 44 allows for the mixing of different types of gases, before the gas mixture continues to the plasma torch 41. The gas selection consol 45 allows the selection and mixing of one of a plurality gases, the selected gases can then be metered by the gas metering console 44. The gas consol can receive gas inputs including, for example, oxygen, nitrogen, F5, H35, H5, and air. The gas metering consol 44 can then measure the plasma gas and shield gas. This control configuration allows for the plasma system to rapidly change the required shield gas or gas mixture for hole piercing, hole cutting, or contour cutting. For example, when cutting a hole feature the gas consol 40 can provide air as the shield gas during the piercing process and when the piercing of the metal plate is complete, the gas consol 40 can automatically switch the shield gas to $O_2$ for hole cutting. When the plasma system moves to cut a contour, the gas consol 40 can switch the shield gas back to air as the shield gas for both the piercing and cutting processes. Such rapid switching can be directed by code or programming in the CNC 12. In one embodiment, the shield gas composition for cutting a hole is $O_2$. In some embodiments, the shield gas composition selected when cutting a hole feature contains less nitrogen than the shield gas composition used when cutting a contour. In some embodiments, the shield gas composition used when cutting a hole feature can include He, $N_2$, $O_2$, or combinations thereof.

The gas supply line 42 configured to carry the shield gas flow can be referred to as shield gas supply line 42A in some embodiments. And in some embodiments, the gas supply line that carry plasma gas flow are referred to as plasma gas supply line 42B. In some embodiments, the composition of the plasma gas flow is controlled using valves 47. In some embodiments the valves 47 are on-off solenoid valves, and in some embodiments the valves are variable solenoid valves. In some embodiments, the plasma and shield gas (e.g., secondary gas) can be $O_2$, Air, He, $N_2$ or some combination thereof The gas metering console 44 can also include a venting valve 48 which can also be an on/off valve or a solenoid valve. In some embodiments, the vent valve 48 is used to enable rapid switching of the plasma gas and shield gas.

The CNC 12 can be any computer that controls a plasma torch system. A CNC 12 can have a processor, electronic storage device, and an interface for providing control instructions to a plasma arc torch. The storage device can be internal or external and can contain data relating to the part to be cut in the workpiece. In other embodiments, the CNC 12 can be manually programmed, and in some embodiments the CNC 12 can include a computer readable product that includes computer readable instructions that can select or configure operating parameters of the plasma torch system.

Reproduced below are exemplary computer readable instructions for a CNC 12.

The exemplary instructions below correspond to a round hole feature cut into a square contour cut using a Hypertherm Automation Voyager CNC controller with an HPR 260 Autogas Console, all manufactured by Hypertherm, Inc. of Hanover, N.H. The exemplary code below, used with the Hypertherm Automation CNC controllers, provides two separate cut charts for the hole (G59 V503 F1.01 through G59 V507 F31) and for the contour (G59 V503 F1 through G59 V507 F31). Other forms of code, or computer readable instructions, can be used with one or more cut charts to provide a similar, or even identical final output. Notably, the left column in the exemplary code below contains the referenced code lines; the right column provides general a generic explanation of the instructions contained in each code line.

| | |
|---|---|
| G20 | English units are sets |
| G91 | Incremental programming mode |
| G59 V503 F1.01 | Load a custom cut chart for a hole |
| G59 V504 F130 | " |
| G59 V505 F3 | " |
| G59 V507 F31 | " |
| G00X1.7500Y-1.7500 | Move to hole center |
| M07 | Plasma start |
| G03X-0.0970I-0.0485 | Hole motion |
| G03X0.0015Y0.0168I0.0970 | " |
| G03X0.0212Y-0.0792I0.0955J-0.0168 | " |
| M08 | Plasma stop |
| G59 V503 F1 | Load cut chart for contour cut |
| G59 V504 F130 | " |
| G59 V505 F2 | " |
| G59 V507 F31 | " |

-continued

| | |
|---|---|
| G00X-1.6757Y1.5624 | Move to contour start location |
| M07 | Plasma start |
| G01X0.2500 | Contour motion |
| G01X3.0000 | " |
| G01Y-3.0000 | " |
| G01X-3.0000 | " |
| G01Y3.0000 | " |
| G01Y0.2500 | " |
| M08 | Plasma stop |
| M02 | End of program |

In some embodiments, the computer readable products are referred to as cut charts. In some embodiments, the computer readable product (not shown), or cut charts, includes cutting information including instructions to select a first shield gas when the torch 41 is cutting a contour in a workpiece and to select a second shield gas composition when the torch is cutting a hole feature in the same workpiece. In some embodiments, the cut chart contains information that selects the shield gas composition based on the type of cut (e.g., a contour cut or a hole feature cut). In some embodiments, the CNC is able to rapidly switch from one shield gas to another depending on the instructions contained in the cut chart. In some embodiments, the torch operator selects the shield gas composition and the CNC 12 only provides signals to control, for example, the plasma gas supply line valves 44 based on the information input from the torch operator.

In some embodiments, the torch operator selects a cutting program that includes both hole feature and contour cutting instructions. An operator can select a hole cut chart and a contour cut chart designed to execute consecutively. In some embodiments, the hole feature cut will be positioned within the contour cut anticipated by the CNC 12 on the workpiece. When a cutting program includes instructions for both hole feature cuts and contour cuts, the cut chart will include further instructions such that the hole feature is cut first using a second shield gas composition and then the contour cut is cut using a first shield gas composition. Cutting the hole features first within a profile of the anticipated contour cut prevents movement of the workpiece while the hole features are being cut, thus eliminating deviations that would occur if the contour cuts of the part were cut first and the hole features cut second.

In other embodiments, the computer readable product is nesting software, such as nesting software made by MTC of Lockport, N.Y. Nesting software can provide code that designates when the first shield and second shield gases are to be used based upon CAD drawings of the part to be cut. The nesting software can use the CAD drawing to identify the hole features or small internal features based upon the ratio of a hole feature diameter to the thickness of the workpiece. The nesting software can then provide instructions to the CNC 12 so that the first shield gas is used when cutting contours and the second shield gas is used when cutting hole features. Alternatively, the CNC can include software that selects the appropriate shield gas, for hole feature cutting and contour cutting without being provided instructions from the nesting software.

Figure 6A:
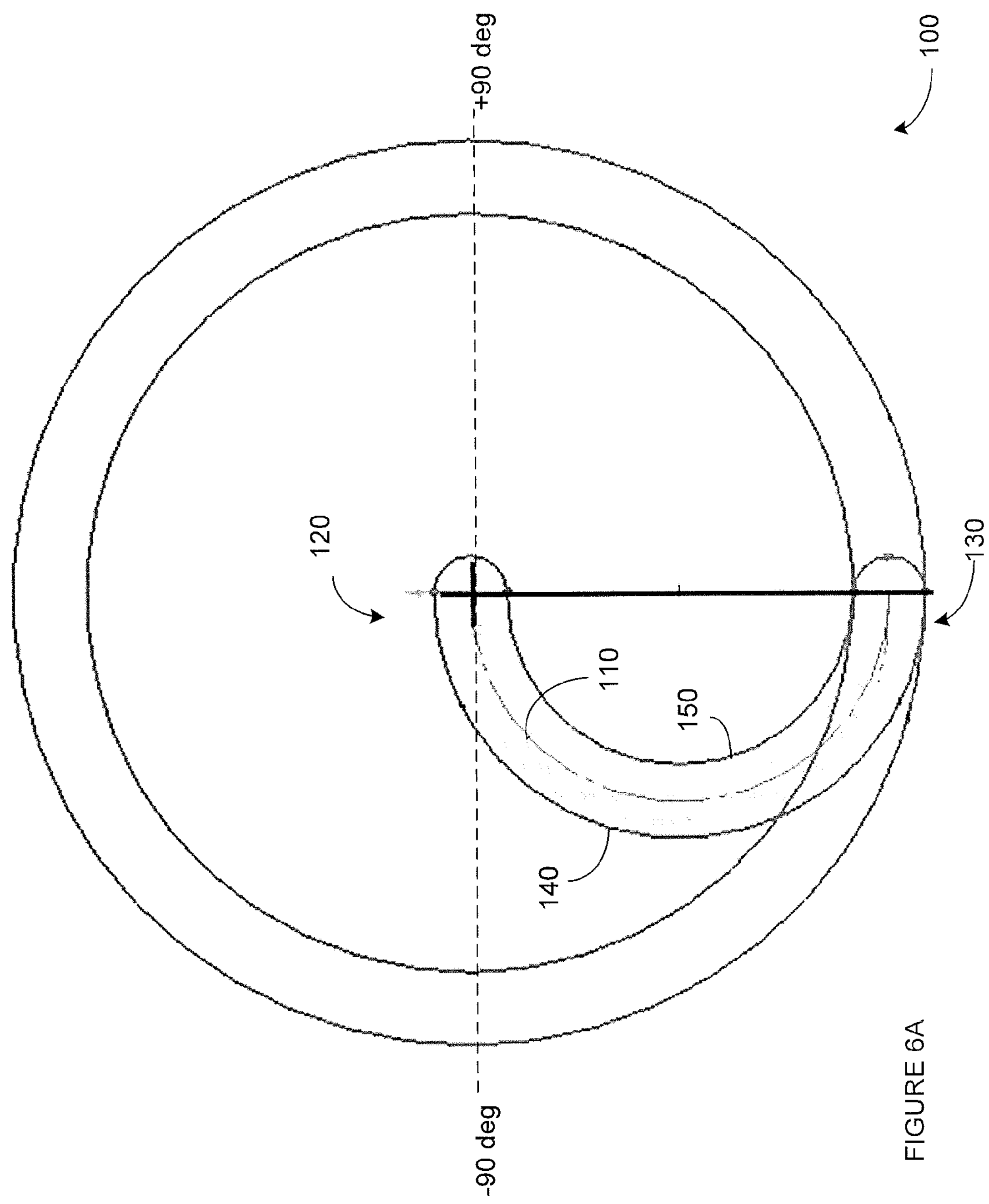
FIG. 6A is a schematic showing a first zone of a path followed by a plasma arc torch head, according to an illustrative embodiment of the invention.
Figure 6B:
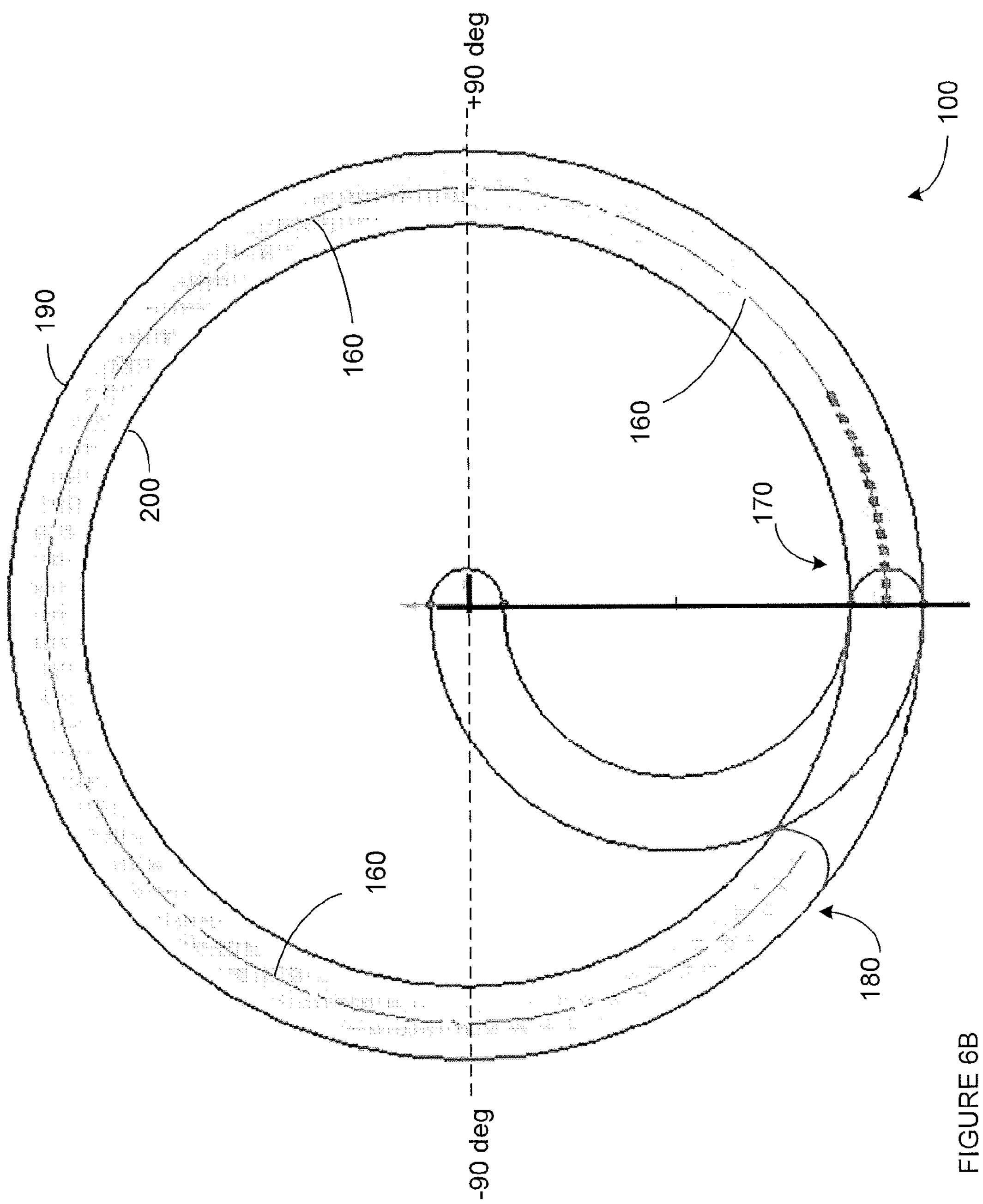
FIG. 6B is a schematic showing a second zone of the path followed by a plasma arc torch head, according to an illustrative embodiment of the invention.
Figure 6C:
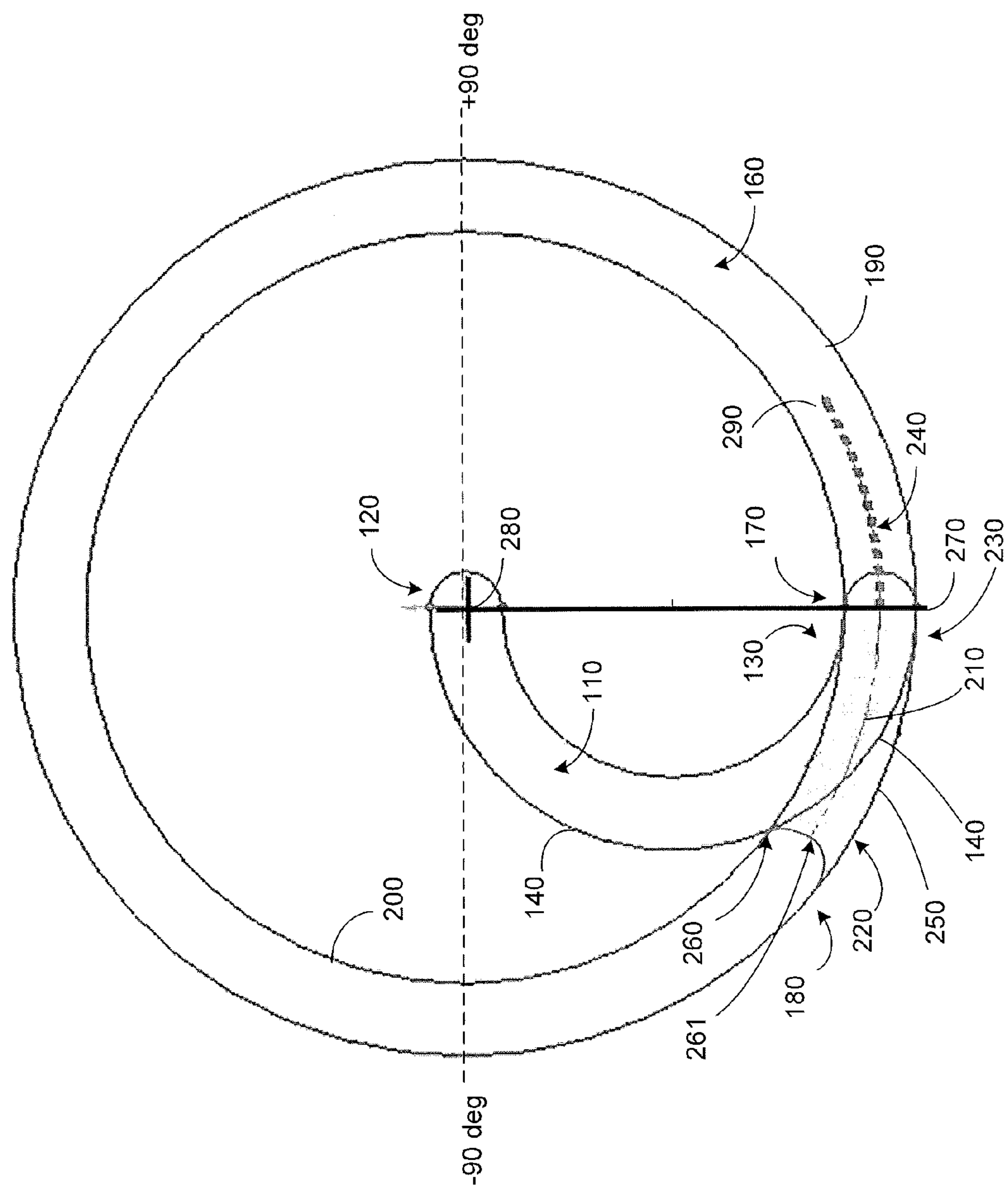
FIG. 6C is a schematic showing a third zone of the path followed by a plasma arc torch head, according to an illustrative embodiment of the invention.

FIGS. 6A-6C show a path 100 for cutting a hole feature (e.g., a substantially circular hole or rounded slot) from a workpiece, according to an illustrative embodiment of the invention. The path can include at least three zones: a first zone, a second zone, and a third zone. The term "zone(s)" as used herein can be defined to include segments or portions of a cut or travel path of a torch head over a workpiece. In some embodiments, the path includes a fourth zone. The path can define the motion of the plasma arc torch (e.g., the torch shown in FIG. 1), regardless of whether the cutting current is running or extinguished (i.e., regardless of whether the plasma arc torch is cutting the workpiece). For purposes of clarity, the individual zones have been defined in the figures, however, the transitions between zones (e.g., the transition from the first zone to the second zone, transition from the second zone to the third zone, etc.) is not a precise location, but can be a buffer type region.

FIG. 6A shows the first zone 110 of the path, which can define a "lead-in" of a cut. The plasma arc torch can cut along the first zone 110 from a beginning 120 of the first zone to an end 130 of the first zone. A cut along the first zone of the path 110 can include a corresponding outer kerf edge 140 and a corresponding inner kerf edge 150. In this embodiment, the first zone 110 defines a "semi-circle" shaped lead-in cut. The shape of the first zone 110 (e.g., the shape of the lead-in) and the command speed are parameters that can affect the quality of the hole feature cut from the workpiece. The command speed can be a set point for a torch/cutting speed. The torch speed can be defined as the command speed offset by an acceleration or deceleration of the torch to reach the command speed setpoint and inefficiencies or limitations inherent in the plasma arc torch system.

FIG. 6B shows a second zone 160 of the path, which can define a perimeter of the cut (e.g., the hole perimeter and/or the perimeter of the hole feature). The plasma arc torch can cut along the second zone 160 from a beginning 170 of the second zone 160 to an end 180 of the second zone 160. As shown, the torch head can move from the end 130 of the first zone 110 into the beginning 170 of the second zone 160. The cut in the second zone 160 can include a corresponding outer kerf edge 190 and a corresponding inner kerf edge 200.

FIG. 6C shows the third zone 210 of the path, which can define a kerf break-in region (e.g., "lead-out") of the cut. The plasma arc torch can cut along the path in the third zone 210 from a beginning 220 of the third zone 210 to an end 230 of the third zone 210 (e.g., where the first zone 110, second zone 160, and third zone 210 substantially intersect). As shown, the torch head can move from the end 230 of the third zone 210 into, for example, a location 240 corresponding back to the beginning 170 of the second zone 160. The cut in the third zone 210 can include a corresponding outer kerf edge 250.

The third zone 210 of the path can begin at or near a point 260 where the outer kerf edge 140 of the first zone 110 (e.g., the lead-in) substantially intersects with the inner kerf edge 200 of the second zone 160. The point 260 as shown in the figure is approximated, as the leading edge 261 of the kerf (e.g., the leading edge of the cut in the second zone 160) would break into the outer kerf edge 140 of the first zone 110 before the inner kerf edge 200. Therefore, the kerf break-in region would in fact take place where the leading edge 261 of the kerf (e.g., the leading edge of the cut in the second zone 160) would break into the outer kerf edge 140 of the first zone 110. However, for purposes of clarity, the third zone 210 of the path can be defined to begin at or near point 260. In this embodiment, the third zone 210 of the path ends at or substantially near a "0 degree point" 270 corresponding to the location where the outer kerf edge 140 of the first zone 110 (e.g. the lead-in) substantially intersects with the outer kerf edge 250 of the third zone 210 and/or the outer kerf edge 190 of the beginning 170 of second zone 160. The ramp down of the current in the third zone 210 and/or varying the command speed of the torch in the first zone 110, second zone 160 or third zone 210 are parameters that can affect the quality of the hole feature cut from the workpiece.

In some embodiments, where the hole feature is a circular hole feature with minimal defects, a distance from a center 280 of the hole feature to an outer kerf edge 190 of the cut in the second zone 160 can be substantially similar to a distance from the center of the hole feature to an outer kerf edge 250 of the cut in the third zone 210 at a point where the first zone 110 and third zone 210 intersect.

To cut a hole feature from a workpiece, a plasma arc torch can move from the first zone 110, to the second zone 160, then to the third zone 210, and then into a fourth zone. The movement of the torch head can follow a path starting from the beginning 120 of the first zone 110, to the end 130 of the first zone 110. From the end 130 of the first zone 110, the torch can move to the beginning 170 of the second zone continuing to the end 180 of the second zone. From the end 180 of the second zone 160, the torch can move to the beginning 220 of the third zone 210 continuing to the end 230 of the third zone 210. At the end 230 of the third zone 210, the torch can continue a path 240 that overlaps with the beginning 170 of the second zone 160 or to another location on the workpiece. The hole feature can be defined, at least in part, by an outer kerf edge 190 of the cut in the second zone 160 and at least a portion of an outer kerf edge 250 of the cut in the third zone 210.

To cut a hole feature in a workpiece, a plasma gas flow can be initiated and a current flow can be initiated to ignite a pilot arc. The arc can be transferred to the workpiece. In some embodiments, a plasma arc torch begins cutting a hole feature in a workpiece by piercing the workpiece at a first location (e.g., a beginning 120 of the first zone 110 or point 280) and cuts a semicircle in the workpiece (e.g., a semi-circle path) along the first zone 110 of the path. The plasma arc torch can cut along the first zone 110 and "lead-in" to the second zone 160 of the path and begin cutting the perimeter of the hole feature. The plasma arc torch can cut along the second zone 160 of the path into the third zone 210 of the path. In some embodiments, the plasma arc torch cuts along the second zone 160 of the path using $O_2$ plasma gas and $O_2$ shield gas. The plasma arc torch can cut the workpiece in the third zone 210 while either substantially maintaining the command speed of the torch or while increasing the command speed of the torch. The plasma arc torch can continue to cut the workpiece in the third zone 210 of the path until it reaches at or substantially near a "0 degree point" 270 (e.g., where the outer kerf edge 140 of the first zone 110 (e.g. the lead-in) substantially intersects with the outer kerf edge 250 of the third zone 210 and/or the outer kerf edge 190 of the beginning 170 of second zone 160). The cutting current can be ramped down in the third zone 210 such that the cutting current is extinguished and/or the arc is "shut off" (e.g., the plasma arc torch stops cutting the workpiece) as the plasma arc torch reaches at or near this "0 degree point" 270 (e.g., the arc shut off point). The torch head can continue moving past the "0 degree point" 270 even though the torch is no longer cutting the workpiece. After the torch head reaches the "0 degree point" 270 and after the arc has been extinguished, the torch head can be decelerated along a path 240. The torch head can be decelerated while moving a path 240 that overlaps with the second zone 160. If the torch is decelerated along a path 240 that follows the circular path of the hole feature, as shown in FIG. 6C, the following equations can be used to calculate the "lead-out" motion angle (e.g., the angle traveled by the torch head after the "0 degree point" 270 after which the torch is decelerated to a stop) and the minimum "lead-out" motion length (e.g., the distance traveled by the torch head after the "0 degree point" 270 after which the torch is decelerated to a stop):

$$L = \frac{V^2}{(2 \cdot a)} \quad \text{EQN. 1}$$

$$\Phi = 360 \cdot \frac{L}{(\Pi \cdot D)} \quad \text{EQN. 2}$$

where "L" is the minimum lead-out motion length, "V" is the velocity of the torch head, "a" is a table deceleration and "D" is the motion diameter of the hole feature. In some embodiments, the torch head begins to decelerate only after the current has been extinguished. The minimum lead-out motion length "L" can be defined as the minimum distance required between the "0 degree point" 270 and the point where the torch decelerates to a stop to ensure that the torch does not begin decelerating prior to the "0 degree point" 270. The torch head can be commanded to decelerate to a stop at point 290 a predetermined distance after the "0 degree point" 270. In some embodiments, the minimum lead-out motion length is about ¼ of an inch.

Figure 6D:
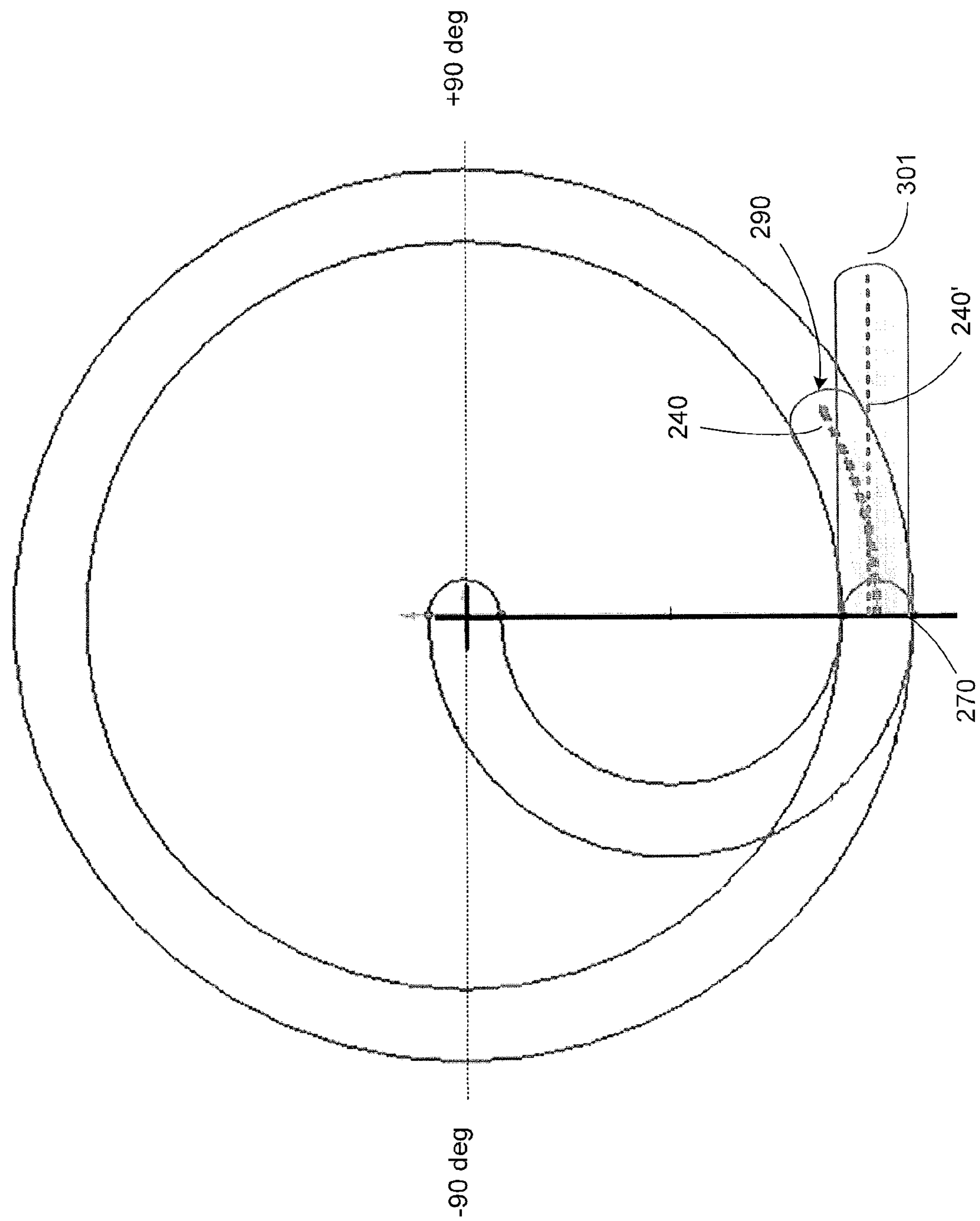
FIG. 6D is a schematic showing a fourth zone of followed by a plasma arc torch head, according to an illustrative embodiment of the invention.

FIG. 6D shows a fourth zone 240 or 240' of a path (e.g., a "deceleration zone") for a plasma arc torch head, according to an illustrative embodiment of the invention. As noted above, the plasma arc torch can stop cutting (e.g., the cutting current extinguished) as the plasma arc torch reaches at or substantially near the "0 degree point" 270 (e.g., where the outer kerf edge 140 of the first zone 110 substantially intersects with the outer kerf edge 250 of the third zone 210 and/or the outer kerf edge 190 of the beginning 170 of second zone 160). The plasma arc torch head can enter a fourth zone 240 or 240' of the path and decelerate in the fourth zone.

In some embodiments, the fourth zone 240 substantially overlaps in space with a beginning 170 the second zone 160. In some embodiments, the torch head can travel in the fourth zone 240' where the path extends to another location on the workpiece. In some embodiments, the torch head can be decelerated to a stop at point 290 or 301 located at a predetermined distance (e.g., ¼ of an inch) after the "0 degree point" 270 so that the torch does not begin to decelerate until the arc is substantially extinguished.

A method for cutting a hole feature from a workpiece can include cutting in the first zone 110 using at least one cutting parameter from a first cutting parameter set, cutting in the second zone 160 using at least one cutting parameter from a second cutting parameter set, and cutting in the third zone 210 using at least one cutting parameter from a third cutting parameter set. The first cutting parameter set can include a first cutting current or a first command speed establishing a first torch speed. The command speed can be a setpoint for the speed set by a user, CNC, or computer program, etc. The torch/cutting speed can be defined as the command speed offset by an acceleration/deceleration of the torch to reach the command speed setpoint and any inefficiencies/limitations inherent in the plasma arc torch system. The second cutting parameter set can be different from (e.g., have at least one parameter different from) the first cutting parameter set and can include a second cutting current or a second command speed (e.g., greater than the first command speed) establishing a second torch speed. The third cutting parameter set can be different from (e.g., have at least one parameter different from) the first cutting parameter set or the second cutting parameter set and can include a third cutting current (e.g., less than the second cutting current) or a third command speed establishing a third torch speed. The first, second and third parameter sets can be independent from one another (e.g., the parameters are selected independently of one another).

In some embodiments, no two parameter sets are identical. For example, the plasma arc torch system can change a command speed when transitioning from the first zone to the second zone (e.g., increase the command speed so that the command speed in the second zone is higher). A higher command speed (e.g., resulting in a higher torch speed) can be used to cut the second zone (e.g., perimeter) than the first zone (e.g., lead in) so as to minimize changes in centripetal acceleration and minimize dynamic responses by the arc. If a command speed were to be substantially maintained between the first zone and the second zone, the centripetal acceleration in the first zone would be greater than the second zone, which can result in dynamic responses by the cutting arc and unwanted defects. The plasma arc torch system can also change a cutting current when transitioning from the second zone to the third zone (e.g., ramp down the cutting current in the third zone). The plasma arc torch system can also change the torch speed when transitioning from the third zone to the fourth zone (e.g., begin to decelerate the torch after the cutting current has been extinguished).

Figure 6E:
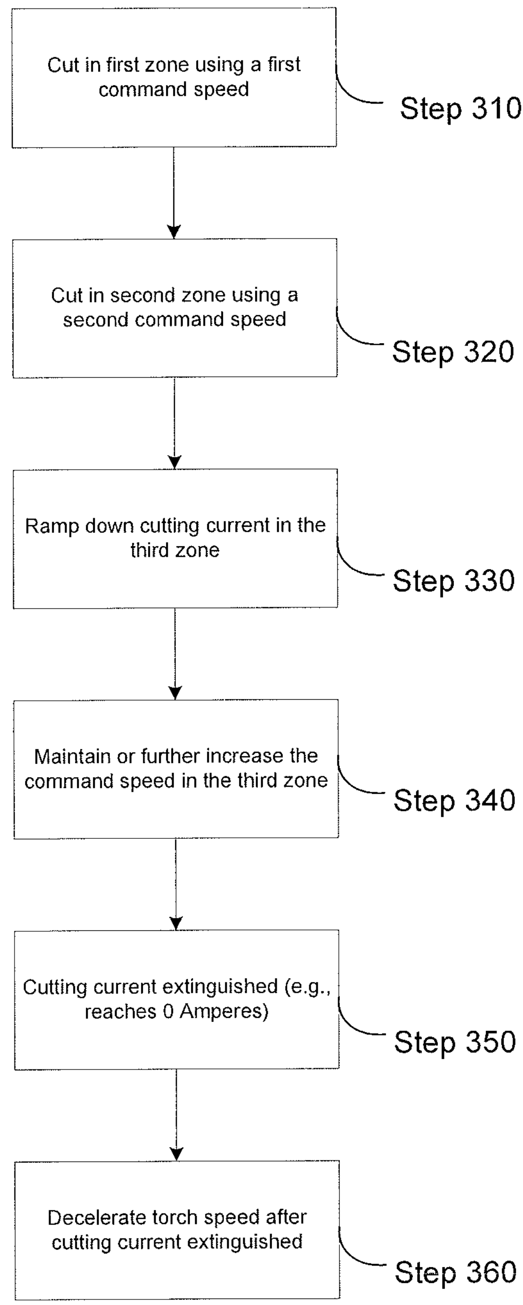
FIG. 6E shows a method for cutting a hole feature from a workpiece, according to an illustrative embodiment of the invention.

FIG. 6E shows a method for cutting a hole feature from a workpiece, according to an illustrative embodiment of the invention. The method can include step 310 of cutting in the first zone 110 using a first command speed establishing a first torch speed, step 320. The method can also include cutting in the second zone 160 using a second, different, command speed establishing a second torch speed, such that the torch speed is increased when moving from the first zone to the second zone. In some embodiments, the first command speed and the second command speed are part of an acceleration curve (e.g., where the second command speed is greater than the first command speed). In some embodiments, the workpiece is cut at a first torch speed (e.g., established by a command speed) where the first zone and the second zone substantially intersect and a second, greater, torch speed is used to cut at least a portion of the second zone (e.g., a majority of the second zone). As noted above, the torch speed can be increased when moving from the first zone to the second zone so as to minimize changes in centripetal acceleration and dynamic responses by the cutting arc which can result in unwanted defects. The method can also include step 330 of ramping down a cutting current (e.g., reducing a cutting current) in the third zone 210 such that the cutting current reaches substantially zero amperes (step 350) at a location/point corresponding to a beginning 170 of the second zone 210 where the first zone 110, second zone 160 and third zone 210 substantially intersect (e.g., at or substantially near the "0 degree point" 270 as shown in FIGS. 6C and 6D). The method can include substantially maintaining or further increasing the command speed in the third zone during ramp down of the current (step 340). The method can include decelerating a torch speed of the plasma cutting system after the cutting current has reached substantially zero (Step 360).

The command speed of the cut for the second zone 160 can be different (e.g., greater than) than a command speed of the cut in the first zone 110. The first command speed can be based at least in part on a diameter of the hole feature. The third zone 210 can be cut with a command speed (e.g., a third command speed) greater than the command speed of the second zone 160 of the cut. The torch speed can be decelerated after a point where the outer kerf edge 140 of the cut in the first zone 110 substantially intersects with the outer kerf edge 250 of the cut in the third zone 210 (e.g., the "0 degree point" 270 as shown in FIGS. 6C and 6D). The torch speed (e.g., the actual speed of the torch head) can be decelerated to reach zero at a predetermined distance after the point where the outer kerf edge 140 of the cut in the first zone 110 substantially intersects with the outer kerf edge 250 of the cut in the third zone 210.

The plasma cutting current in the third zone 210 (e.g., the third cutting current) can be extinguished when a torch head passes from the third zone 210 to the second zone 160 at a location where the first zone 110, second zone 160 and third zone 210 substantially intersect. The cutting current can be reduced (e.g., ramped down) in the third zone 210 such that the cutting current reaches substantially zero amperes at a point/location where an outer kerf edge 250 of the cut in the third zone 210 substantially meets an outer kerf edge 140 of the cut in the first zone 110. The ramp down for the cutting current in the third zone 210 can be ramped down at a rate based, at least in part, upon a length between a beginning 220 of the third zone 210 and the beginning 170 of the second zone 160. Alternatively, the rate at which the cutting current is ramped down can be a function of a diameter of the hole feature to be cut from the workpiece. A ramp down of the cutting current can be initiated at a location in the third zone 210 determined by the third torch speed and a ramp down time (e.g., the time required for the current to reach substantially zero amperes).

The plasma arc torch can cut in the first zone 110, second zone 160, and/or the third zone 210 using a gas flow composition of O2 plasma gas and O2 shield gas (e.g., or low $N_2$ gas composition) to reduce defects such as bevel and/or taper of the hole feature.

Figure 1:
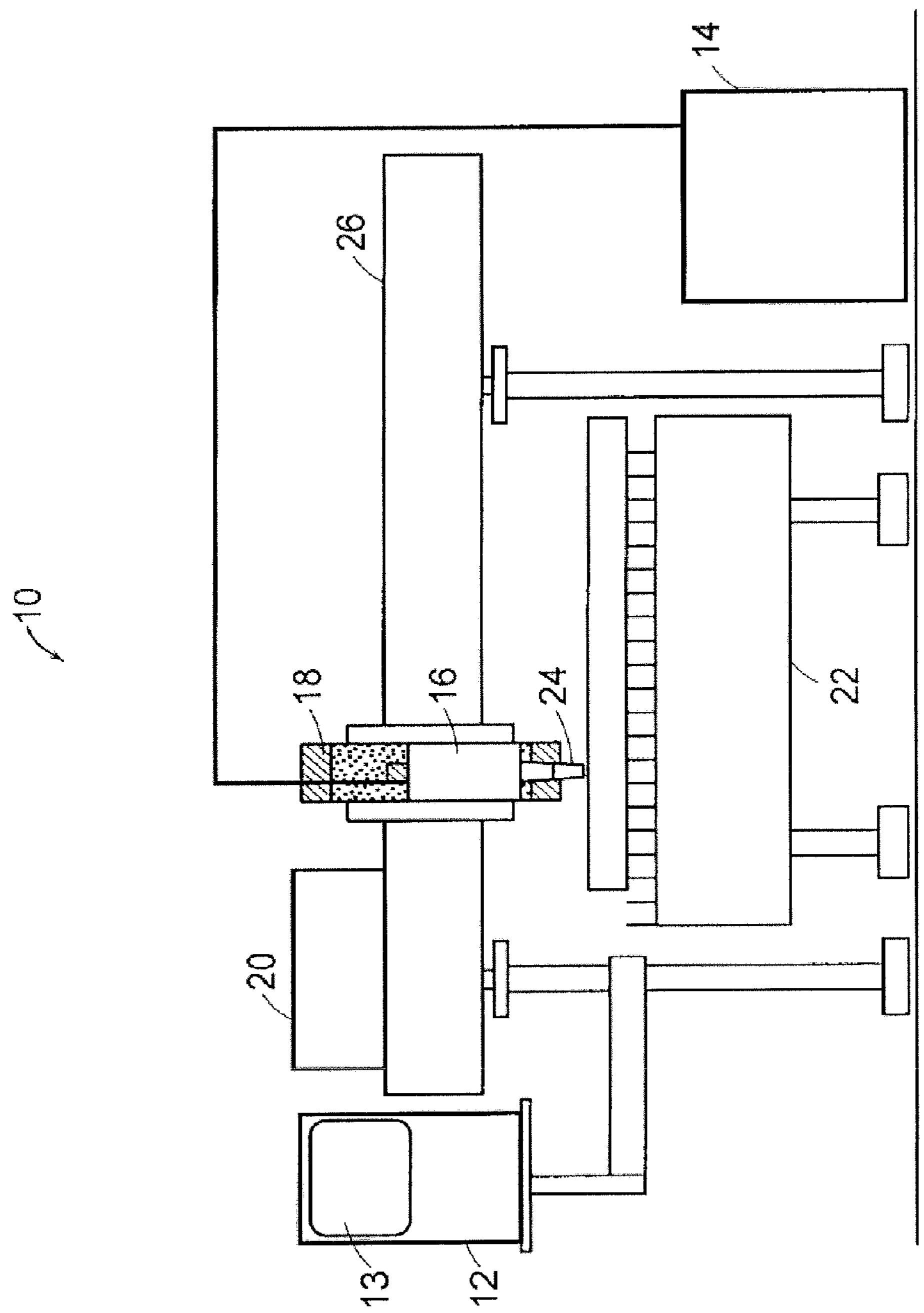
FIG. 1 is a diagram of a known mechanized plasma arc torch system.

A plasma arc torch system (e.g., as shown in FIG. 1) can be used to cut a hole feature in a workpiece along a first zone 110, a second zone 160, and a third zone 210. The plasma arc torch system can include a plasma torch 24 including an electrode 27 and a nozzle 28, a lead that provides a cutting current to the plasma arc torch 24, a gantry 26 that moves the plasma torch and a CNC 12 that controls cutting parameters of the plasma arc torch in the first zone 110, the second zone 160, and the third zone 210. A CNC 12 can select cutting parameters for cutting a hole feature in a workpiece. A computer readable product, tangibly embodied on an information carrier, and operable on a CNC 12, can include instructions being operable to cause the CNC 12 to select the cutting parameters. The CNC 12 can establish a first command speed for the first zone 110 and a second command speed for the second zone 160. The first command speed can be based, at least part, on a diameter of the hole feature. The second command speed can be greater than the first command speed. The CNC 12 can also establish a third cutting current for the third zone 210 and ramp down the third cutting current so that the third cutting current reaches substantially zero amperes where an outer kerf edge 140 of the cut in the first zone 110 substantially intersects with an outer kerf edge 250 of the cut in the third zone 210. The CNC 12 can include a look-up table to identify the cutting parameters of the plasma arc torch.

Figure 6F:
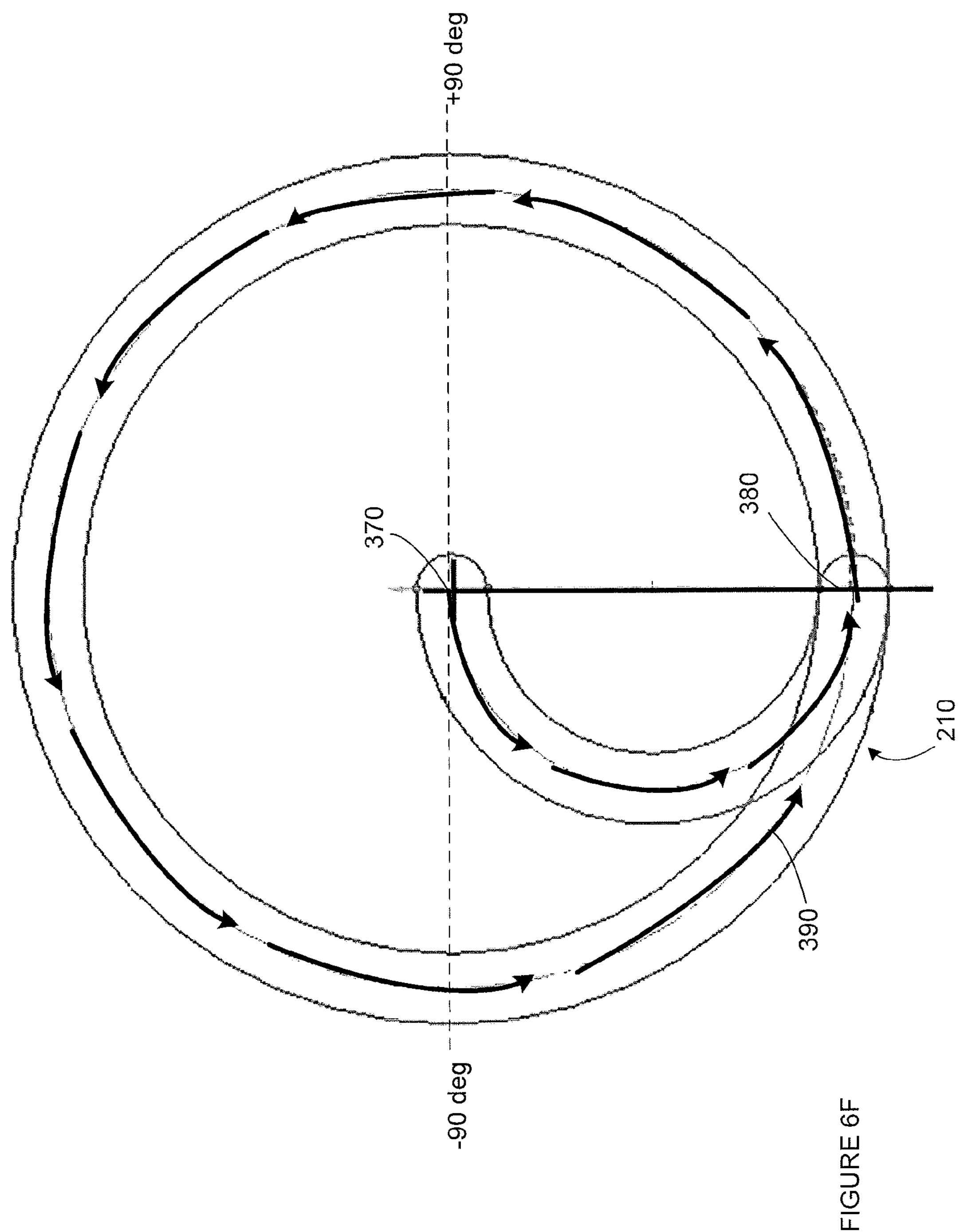
FIG. 6F shows a method for cutting a hole feature from a workpiece, according to another illustrative embodiment of the invention.

FIG. 6F shows a method for cutting a hole feature from a workpiece, according to another illustrative embodiment of the invention. FIG. 6F shows an exemplary movement path followed by a plasma arc torch during hole cutting, the movement path traced out along the top of a workpiece. First, the plasma gas and shield gas flow can be initiated, along with the arc current. The initiation of the gas flows and the current arc can vary depending on the consumable and torch configuration being used by the operator. U.S. Pat. Nos. 5,070,227, 5,166,494, and 5,170,033, all assigned to Hypertherm®, Inc. and incorporated herein by reference in their entireties, describe various gas flow and current settings that can be used during initiation, operation, and shut-down of the plasma arc, and cutting process. After the plasma arc is initiated, it is transferred to the workpiece. Once the arc is transferred to the workpiece, in some embodiments, the torch height is lowered using the torch height controller. A hole cut is begun in a workpiece by first piercing the workpiece (e.g., at point 370) using the plasma arc. Once the workpiece is pierced through by the plasma arc, the shield gas can be switched to a shield gas composition optimized for hole cutting. In some embodiments, the torch will begin to translate across the workpiece to cut the hole feature into the workpiece along the hole cut pattern which can be, in some embodiments, determined by the part drawing plasma and shield.

To cut a hole feature from a workpiece, the workpiece can be pierced (e.g., at a piercing position 370) to begin cutting an internal feature/hole feature in the workpiece. A cutting arc and a cut speed can be established with respect to the workpiece (e.g., piercing the workpiece at point 370 and setting a command speed that defines the cut speed). The cut speed can be increased to a second cut speed after a first point 380 (e.g., after the end of the first zone as described above in FIG. 6A) in a hole cut path. In some embodiments, the plasma arc torch can cut the workpiece in the third zone so that the amount of current per linear distance traveled reduces as the torch cuts along the third zone. A cutting current can be ramped down after a second point 390 in the hole cut path (e.g., after the end of the second zone and at or after the beginning of the third zone as described above in FIGS. 6B-6C) either while substantially maintaining the cut speed or while increasing the cut speed. The plasma arc torch can also substantially maintain the cutting current but increase the command speed (e.g., thereby increasing the torch speed) while cutting in the third zone. The torch can cut from the second point 390 in the hole cut path and return back to the first point 380 in the hole cut path to form the hole feature in the workpiece. The cutting current can be ramped down while cutting from the second point 390 in the hole cut path back to the first point 380 in the hole cut path. The cutting arc can be extinguished substantially near the first point 380 in the hole cut path (e.g., near the "0 degree point" 270 shown in FIGS. 6C-6D). The second cut speed can either be maintained until the cutting current reaches substantially zero amperes or the second cut speed can be increased to a third cut speed before the cutting current reaches substantially zero amperes (e.g., at or near first point 380).

Any of the techniques described herein can be used to cut two or more features (e.g., hole features 105 and/or contours 115 or 120 as shown in FIG. 3) in a workpiece using an automated method/process. An automated method can be used to cut a plurality of hole features or other features (e.g., contours) using a plasma arc torch. "Automated method" as used herein implies that the process is performed automatically (e.g., with minimal or no interaction by an operator) by a plasmas arc torch system using one set of consumables (e.g., an operator does not need to change consumables during the cut).

For example, an automated process can include a step a) of cutting a lead-in for a hole feature (e.g., as shown in FIG. 6A) using a lead-in command speed based on a diameter of that hole feature and step b) of cutting a perimeter of the hole feature (e.g., as shown in FIG. 6B) using a perimeter command speed greater than the corresponding lead-in command speed for the hole feature. Steps a) and b) can be automatically repeated for each additional hole feature having a same diameter or a different diameter. The automated process can also include cutting one or more contours in addition to the hole features. A contour (e.g., features 115 or 120 shown in FIG. 3) can be cut using a secondary gas composition (e.g., via the gas control system of FIG. 5) having a higher nitrogen content than the secondary gas composition used to cut the plurality of hole features.

In another embodiment, a first hole feature having a first diameter and a second hole feature having a second diameter greater than the first diameter, can be cut using an automated process (e.g., automatically cut by a plasma arc torch using one set of consumables, without changing consumables). Each hole feature can include a lead-in portion (e.g., first zone of FIG. 6A), a hole perimeter portion (e.g., second zone of FIG. 6B), and a lead-out portion (e.g., third zone of FIG. 6C). By way of example, a first hole feature can be cut using a first command speed and increasing a command speed from the first command speed to a second command speed after cutting the first lead-in to cut at least a portion of the first hole perimeter. The automated method can also include cutting a second hole feature in the workpiece by cutting a second lead-in using a third command speed, the third command speed greater than the first command speed. The command speed can be increased from the third command speed to a fourth command speed after cutting the second lead-in to cut at least a portion of the second hole perimeter. In some embodiments, the fourth command speed and the second command speed are substantially the same. The automated method can also include cutting the first hole feature in the workpiece using a first secondary gas flow, cutting the second hole feature in the workpiece using a second secondary gas flow and cutting a contour (e.g., feature 115 or 120 of FIG. 3) in the workpiece using a third secondary gas flow having a higher nitrogen content than the first secondary gas flow or the second secondary gas flow. The first secondary gas flow and the second secondary gas flow can have substantially the same gas composition.

Another exemplary automated process can be used to cut a plurality (e.g., two or more) hole features (e.g., feature 105 as shown in FIG. 3) in a workpiece. The automated method can include a one or more automated processes used to cut, for example, a first hole feature having a first diameter, a second hole feature having a second diameter greater than the first diameter, and a contour. For example, the first hole feature can be cut using a first automated process by initiating a secondary gas flow (e.g., using the system shown in FIG. 5) having a first gas composition and a first set of cutting parameters. The second hole feature can be cut using a second automated process by initiating the secondary gas flow having a second gas composition and using a second set of cutting parameters. At least one parameter of the second set of cutting parameters can be different from the first set of cutting parameters (e.g., different lead-in command speeds and/or cutting speeds). The contour feature (e.g., features 115 or 120 in FIG. 3) can be cut using a gas composition with a greater nitrogen content used in cutting the hole features. For example, the automated method can include cutting a contour using a third automated process by initiating the secondary gas flow having a third gas composition, the third gas composition having a greater nitrogen content than the first and second gas compositions and using a third set of cutting parameters. At least one parameter (e.g., a gas composition of the secondary gas) of the third set of cutting parameters can be different from the first or second set of cutting parameters. The first set of cutting parameters can include a first lead-in command speed, a first perimeter command speed and the first gas composition. The second set of cutting parameters can include a second lead-in command speed, a second perimeter command speed, and the second gas composition. The third set of cutting parameters can include a contour command speed and the third gas composition. The command speed used to cut the contour can be greater than the command speeds used while cutting the hole features (e.g., the first lead-in command speed, the first perimeter command speed, the second lead-in command speed and the second perimeter command speed). In some embodiments, the first gas composition and the second gas composition are the same or substantially the same.

Figure 11:
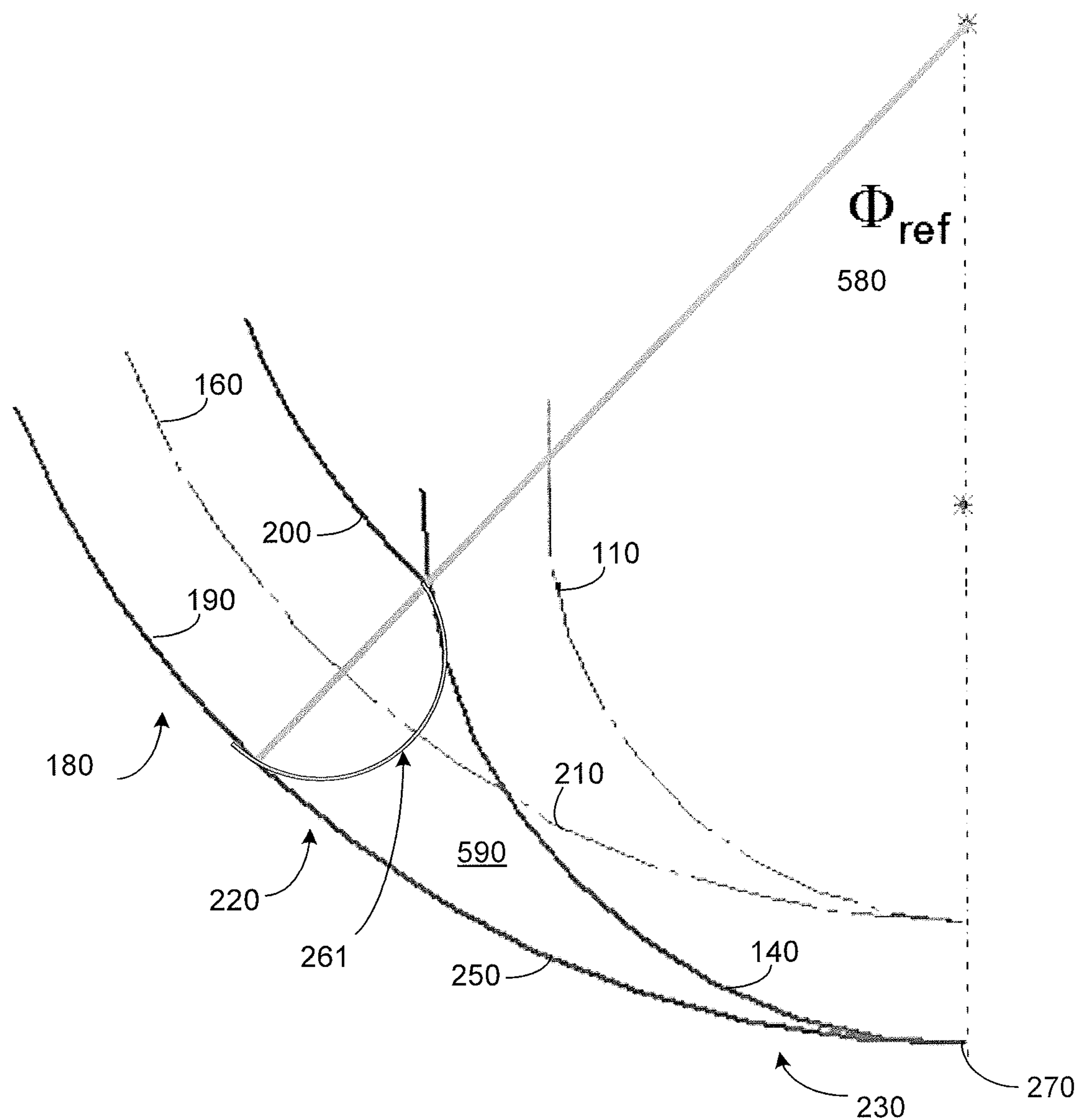
FIG. 11 is a schematic of a portion of a hole cut path, according to an illustrative embodiment of the invention.

In some embodiments, an automated method is used to cut a first hole feature and a second hole feature, the second hole feature larger than the first hole feature. An automated method can include moving the plasma arc torch to a first location and cutting the first hole feature in the workpiece by cutting a first lead-in (e.g., a first zone as shown in FIG. 6A) by ramping up a cutting speed up to a first lead-in cutting speed, increasing the cutting speed after the first lead-in to cut a first perimeter (e.g., a second zone as shown in FIG. 6B), initiating current ramp down after an inner kerf edge of the first perimeter (e.g., inner kerf edge 200 of second zone 160 shown in FIG. 6B) substantially intersects an outer kerf edge of the first lead-in (e.g., outer kerf edge 140 of first zone 110 as shown in FIG. 6A) and maintaining or increasing the cutting speed until a cutting current is extinguished, the cutting current extinguished at or near where an outer kerf edge of the first lead-in substantially joins an outer kerf edge of the first perimeter (e.g., the "0 degree point" as described in FIG. 6C). The current ramp down can be initiated during a lead-out of the cut (e.g., third zone 210 as shown in FIGS. 6C and 11). The method can also include moving the plasma arc torch to a second location and cutting the second hole feature in the workpiece by cutting a second lead-in by ramping up the cutting speed up to a second lead-in cut speed, the second lead-in speed greater than the first lead-in cut speed, increasing the cutting speed after the second lead-in to cut a second perimeter, initiating current ramp down after an inner kerf edge of the second perimeter substantially intersects an outer kerf edge of the second lead-in and maintaining or increasing the cutting speed until the cutting current is extinguished, the cutting current extinguished at or near where an outer kerf edge of the second lead-in joins an outer kerf edge of the second perimeter. In some embodiments, current ramp down is initiated at a point along the lead-out that is based, at least in part, on a diameter of the hole being cut (e.g., hole diameter of the first hole feature or the second hole feature). In some embodiments, the workpiece is pierced to begin cutting each hole feature.

Figure 2:
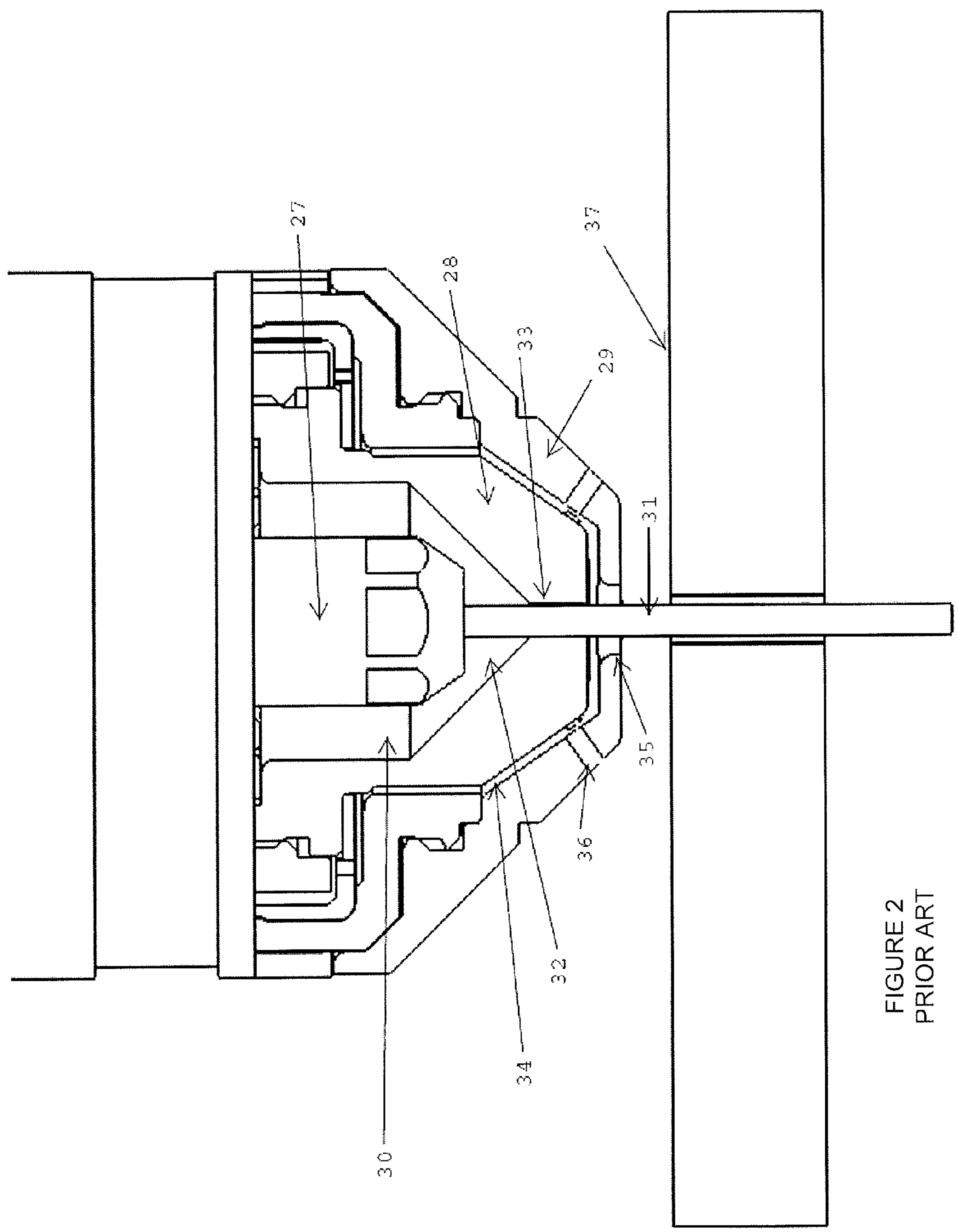
FIG. 2 is a cross sectional view of a known plasma arc torch tip.

The plasma arc torch system (e.g., the system of FIG. 1) can be configured to cut a plurality of hole features and/or contours of varying sizes, dimensions, in workpieces of varying thicknesses. The system (e.g., as shown in FIG. 1) can include a plasma arc torch having an electrode (e.g., electrode 27 of FIG. 2) and a nozzle (e.g., nozzle 28 of FIG. 2) for a corresponding current level and a computer numerical controller (e.g., CNC 12 of FIG. 1). The CNC can be configured to control cutting parameters for the plasma arc torch. For example, the CNC can select, from a plurality of gas compositions (e.g., the secondary gas flow composition from an automatic gas control system as shown in FIG. 5), a first secondary gas composition used to cut hole features and a second secondary gas composition used to cut contours. The CNC can also select, from a plurality of perimeter cutting speeds, a perimeter cutting speed (e.g., cutting speed and/or a corresponding command speed used to cut the second zone as shown in FIG. 6B) based on a material thickness of a workpiece. The CNC can select, from a plurality of lead-in speeds, a lead-in speed (e.g., a cutting speed and/or a corresponding command speed used to cut the first zone as shown in FIG. 6A) based on a size of a hole feature to be cut and the material thickness of the workpiece, each perimeter cutting speed greater than each corresponding lead-in speed. The lead-in speed can be proportional to the size of the hole feature to be cut. The CNC can be configured to select, from a plurality of negative time offset values, a negative time offset value based on the current level (e.g., cutting current level). A negative time offset value can be associated with an asynchronous stop command. As discussed below, the asynchronous stop command is a command that tells the plasma arc torch to extinguish the plasma arc, but continue moving the torch head. The negative time offset can be defined as a variable having a value that controls/determines when the plasma arc torch begins initiation of current ramp down (e.g., current shut down), while still moving the torch head. A value for the negative time offset can be chosen such that the current ramp down begins at a point so that the current is extinguished by the time the torch head reaches the "0 degree point" as shown in FIG. 6C. The torch head can continue moving until the current is extinguished. The negative time offset can be based on the size of the hole feature to be cut or the current level.

The CNC can be configured to retrieve/read/obtain instructions from a computer readable product. A computer readable product, tangibly embodied on an information carrier, and operable on a CNC for cutting a plurality of hole features and/or contour features in a workpiece with a plasma arc torch system. The computer readable product can be loaded on to the CNC and can include instructions being operable to cause the CNC to select a shield gas composition having a nitrogen content lower than air when cutting a hole. The product can also cause the CNC to establish a lead-in cutting speed (e.g., a cutting speed and/or a corresponding command speed to cut the first zone as shown in FIG. 6A) for a hole feature to be cut, the lead-in cutting speed a function of a diameter of the hole feature to be cut and establish a perimeter cutting speed (e.g., a cutting speed and/or a corresponding command speed to cut the second zone as shown in FIG. 6B) for the hole feature to be cut, the perimeter cutting speed greater than the corresponding lead-in cutting speed. The product can also provide a first command (e.g., an asynchronous stop command) to extinguish a plasma arc, the first command independent of a second command to decelerate a plasma arc torch. The perimeter cutting speed can be based on a thickness of the workpiece.

Figure 7C:
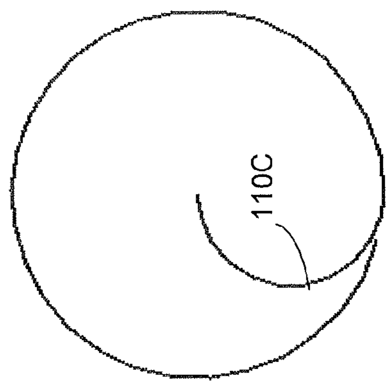
FIG. 7C shows a semi-circle lead-in shape for cutting a hole feature, according to an illustrative embodiment of the invention.
Figure 7B:
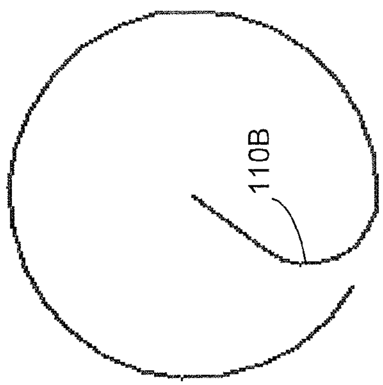
FIG. 7B shows a quarter circle lead-in shape for cutting a hole feature, according to an illustrative embodiment of the invention.
Figure 7A:
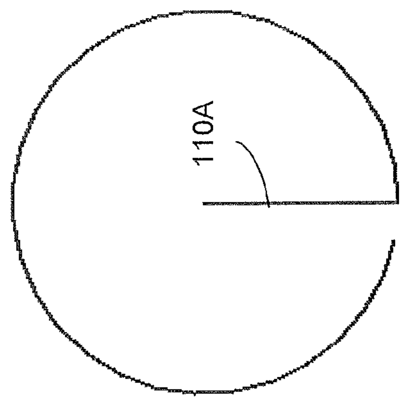
FIG. 7A shows a straight lead-in shape for cutting a hole feature, according to an illustrative embodiment of the invention.

FIGS. 7A-7C show different shapes for the first zone of the path (e.g., lead-in shapes) that can be used in cutting a hole feature from a workpiece, according to illustrative embodiments of the invention. Different lead-in shapes can be used to cut a hole feature from a workpiece. FIG. 7A shows an exemplary straight lead-in shape 110A for cutting a hole feature. FIG. 7B shows an exemplary quarter circle 110B lead-in shape for cutting a hole feature. FIG. 7C shows an exemplary semi-circle lead-in shape 110C for cutting a hole feature.

Figure 8A:
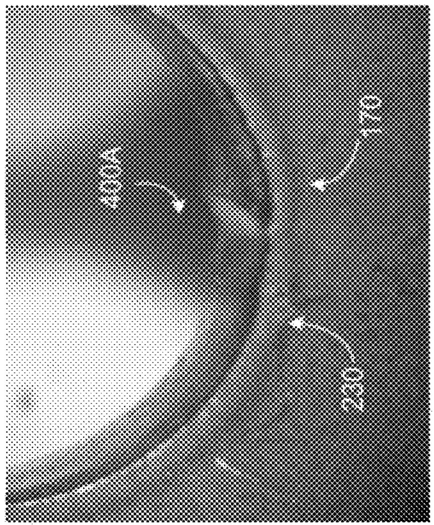
FIG. 8A shows a top view of a hole feature where a first zone of a path for cutting a workpiece is straight, according to an illustrative embodiment of the invention.
Figure 8B:
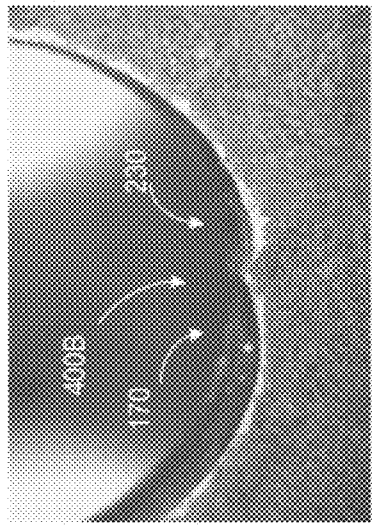
FIG. 8B shows a bottom view of the hole feature from FIG. 8A, according to an illustrative embodiment of the invention.
Figure 8C:
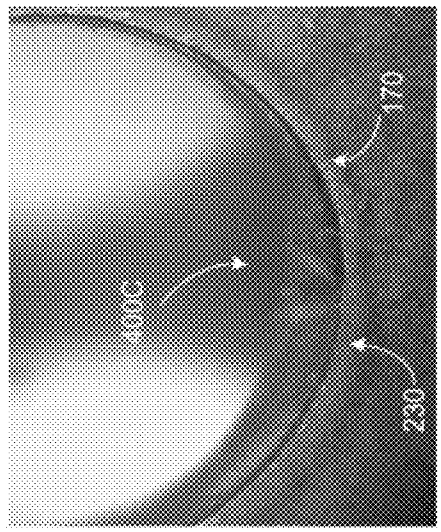
FIG. 8C shows a top view of a hole feature where a first zone of a path for cutting a workpiece is a semi-circle shape, according to an illustrative embodiment of the invention.
Figure 8D:
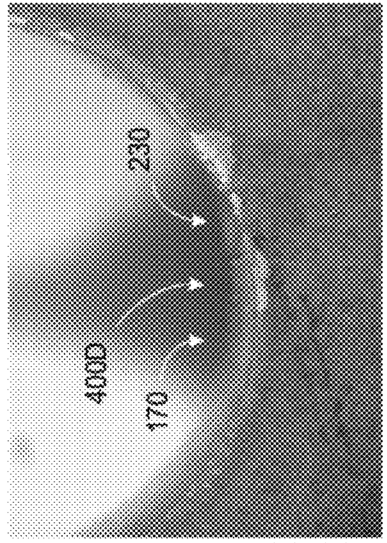
FIG. 8D shows a bottom view of the hole feature from FIG. 8C, according to an illustrative embodiment of the invention.

FIGS. 8A-8D show the results of hole features cut from a workpiece using a semi-circle shaped path in the first zone (e.g., semi circle lead-in) and a hole feature cut from a straight path in the first zone (e.g., a straight lead-in). FIGS. 8A-8D show "transition" points 400A-D where the end 230 of the third zone 210 substantially intersects the beginning 170 of the second zone 160 (e.g., where lead-in of the cut meets the perimeter of the cut and the kerf break-in region (e.g., "lead-out") of the cut). FIG. 8A shows a top view of a hole feature cut from a workpiece using a straight shape for the first zone of the path (e.g., 110A of FIG. 7A). FIG. 8B shows a bottom view of the hole feature of FIG. 8A. FIG. 8C shows a top view of a hole feature using a semi-circle lead-in shape (e.g., 110C of FIG. 7C). FIG. 8D shows a bottom view of the hole feature cut from a workpiece of FIG. 8C. As shown in FIGS. 8A-8B, a hole feature cut using a straight-shaped first zone (e.g., a straight lead-in or 110A of FIG. 8A) resulted in unwanted defects, such as a protrusion. As shown in FIGS. 8C-8D, a hole feature cut using a first zone shaped like a semi-circle 110C (e.g., a semi-circle lead-in) generated a hole feature with less defects than the hole feature cut using a straight lead-in.

Figure 9:
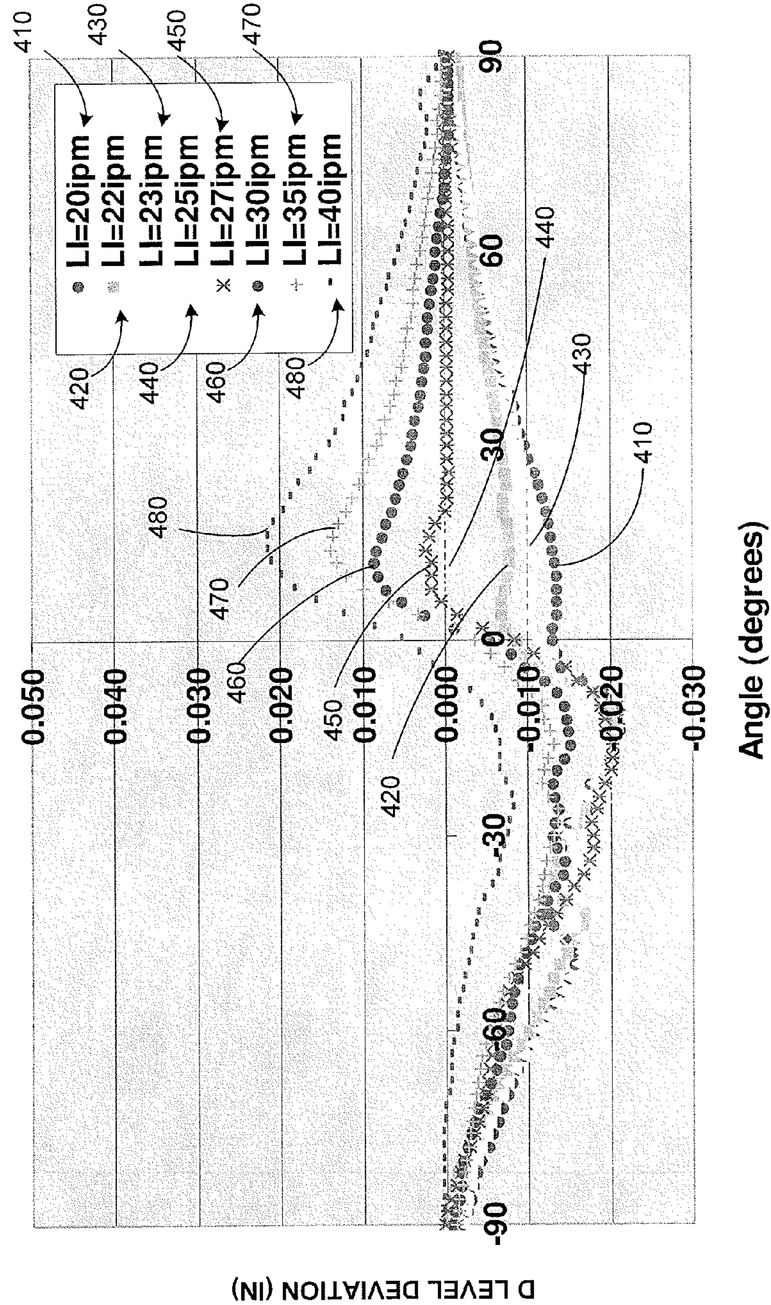
FIG. 9 is a graph showing measured deviations for different lead-in command speeds, according to an illustrative embodiment of the invention.

FIG. 9 is a graph showing measured deviations for different lead-in command speeds, according to illustrative embodiments of the invention. The graph shows measurements of deviations in the hole feature in the transition area where the first zone, second zone and third zone as shown in FIGS. 6A-6C merge. The graph shows deviations ("D level deviations") for different "lead-in speeds" (e.g., command speed set for cutting along the first zone as shown in FIG. 6A). Specifically, the graph shows "D level deviations" which are deviations measured in the hole feature +90 degrees counterclockwise from the "0 degree point" 270 and −90 degrees clockwise from the "0 degree point" 270 as shown in FIGS. 6C-6D. The "0.000" line is where the hole should be if the hole were a "perfect" hole free of defects/deviations. Points above and below the "0.000 line" indicate deviations/defects such as protrusions and divots, respectively. There are smaller deviations/defects at the −90 degree point and +90 degree point and greater deviations/defects near the "0 degree point" (e.g., point 270 in FIGS. 6C-6D). As compared to cylindricity (as described above for FIG. 4), which encompasses the thickness and the perimeter of the hole feature, the deviations in FIG. 9 reflect a segment/portion of the hole feature at a given depth. While it can be desirable for the lead-in speed (e.g., command speed for the first zone of the path) to be less than the speed for cutting the perimeter of the hole (e.g., the command speed for the second zone of the path), there exists an optimal speed for the hole feature. Optimizing the lead-in speed can further reduce deviations (e.g., divots or protrusions) at positive angles (e.g., in the second zone where the first zone transitions into the beginning of the second zone).

A method to measure deviations in the hole feature can include the step of scanning, at a depth near the bottom of the hole, a half circle of the hole feature away from the lead-in and arc shut off region (e.g., scanning a portion of the second zone/perimeter of the hole, for example, clockwise from the −90 degree point to the +90 degree point or counterclockwise from the +90 degree point to the −90 degree point as shown in FIGS. 6A-6D) to determine the hole diameter and center location. The method can include a second step of scanning, at about the same depth, the lead-in and arc shut off region of the hole (e.g., scanning the third zone and the beginning of the second zone, for example, clockwise from the +90 degree point to the −90 degree point or counterclockwise from the −90 degree point to the +90 degree point as shown in FIGS. 6A-6D) and calculate deviations from the measured hole diameter and location (e.g., by comparing the measurements obtained by scanning away from the lead-in and arc shut off region with the measurements obtained by scanning the lead-in and arc shut off region). As noted above the current can be extinguished at or substantially near the "0 degree point" 270 (e.g., where the outer kerf edge of the first zone intersects with the outer kerf edge of the third zone as shown in FIGS. 6C-6D), thus defining the "arc shut off region." The deviation data can be plotted at each angular position. To determine the optimal process for cutting a hole feature, the lead-in speed having minimal defects (e.g., deviation values closest to zero) in the region can be selected for each hole size.

FIG. 9 is a deviation plot for various lead-in speeds (e.g., various speeds for the first zone of the path as shown in FIG. 6A). The holes were 0.394 inch diameter holes cut from ⅜" Mild Steel using a cutting current of 130 amperes and a gas composition of O2/O2 (plasma gas/shield gas). A cutting speed for the perimeter (e.g., second zone in FIG. 6B) of the hole feature was set at about 45 ipm. The optimal lead-in speed for this process, material and hole size were speeds set at about 25-27 ipm (plots 440 & 450). For example, hole features cut from a lead-in speed set at about 40 ipm (plot 480) produced greater defects (i.e., protrusions measured at about 0.023 inches) than holes cut from a cut lead-in speed set at about 25-27 ipm. Hole features cut from a lead-in speed set at about 20 ipm (plot 410) produced greater defects (i.e., divots measured at about −0.013 inches) than holes cut from a cut lead-in speed set at about 25-27 ipm. In contrast, hole features cut at lead-in speeds of about 25-27 ipm produced protrusions (e.g., in portion of the second zone defined clockwise from the +90 degree to the 0 degree point) measured at about 0 inches to about 0.002 inches.

Typically, the optimal lead-in speeds are reduced as the hole diameter gets smaller. A plot of optimal lead-in speed as a function of hole diameter could be tested, similar to the plot shown in FIG. 9, developed and curve fit to an equation. The coefficients for the equation could appear in the hole cut chart which could be read and used in the calculations performed by the CNC. FIG. 10 is an exemplary look-up chart 570 for lead-in command speeds, according to an illustrative embodiment of the invention. As shown in FIG. 10, the optimal lead-in speed can be a function of hole diameter and can vary based on the cutting current level and thickness of the workpiece. The size of the hole feature can be directly related to the magnitude of the lead-in speed. For example, smaller hole features can be cut using lower lead-in speeds and larger hole features can be cut using greater lead-in speeds. For example, a process for cutting a 0.276 inch diameter hole feature from a 0.375 inch mild steel workpiece at 130 Amps can have an optimal lead-in speed set at about 12 ipm to minimize defects in the hole feature. In contrast, a process for cutting a 0.315 inch diameter hole feature from a 0.375 inch mild steel workpiece at 130 Amps can have an optimal lead-in speed set at about 19 ipm to minimize defects in the hole feature.

FIG. 11 shows a third zone for a path used in cutting a hole feature from a workpiece, according to an illustrative embodiment of the invention. The motion of the torch head can follow path 210. The third zone can extend from a point where the outer kerf edge 140 of the first zone 110 (e.g., the lead-in of the cut) intersects with an inner kerf edge 200 of the second zone 160 to the "0 degree point" 270 (e.g., where the outer kerf edge 140 of the first zone 110 merges with the outer kerf edge 250 of the third zone 210). As noted above, this is an approximation as the leading edge 261 of the cut will intersect the outer kerf edge of the first zone before the inner kerf edge 200 of the second zone 160 intersects. When the torch angular position (Φ) 580 while cutting the hole reaches Φref, the kerf leading edge breaks into the lead-in (e.g., first zone) outer kerf edge 140, approximately where third zone 210 begins. As Φ 580 decreases, the amount of material remaining decreases reaching zero at Φ=0 ("0 degree point"). The remaining material (e.g., the "diminishing material" 590) can be calculated as a function of Φ.

The diminishing material 590 can be the leftover material from the workpiece to be cut once the torch head reaches the beginning 220 of the third zone 210. The diminishing material 590 can be defined at least in part by an outer kerf edge 140 of the cut in the first zone 110 and an outer kerf edge 250 of the cut in the third zone 210. Removing too much material can cause divots in the hole feature, while not removing enough material can cause protrusions in the hole feature. Therefore, it is desirable to optimize the material removed in the third zone 210 so that an outer kerf edge 250 of the cut in the third zone 210 substantially aligns with an outer kerf edge 180 of the cut in the second zone 160. As the amount of remaining material to be removed (e.g., the diminishing material 590) to cut the hole feature varies along the third zone 210 (e.g., from the beginning 220 of the third zone 210 to the end 230 of the third zone 210 where the first zone 110, second zone 160, and third zone 210 substantially intersect), the current density used to cut the workpiece as the torch travels along the third zone 210 can be optimized so that the correct amount of material is removed from the workpiece. A ramp down of the cutting current (e.g., the third cutting current) and/or varying the torch speed (e.g., the cutting speed) can be optimized to provide the desired amount of current density per linear distance of the travel by the torch in the third zone 210. A cutting current can be ramped in the third zone 210 to remove a diminishing material 590 such that an outer kerf edge 250 of the cut in the third zone 210 substantially aligns with an outer kerf edge 180 of the cut in the second zone 160. The method can also include substantially maintaining or increasing a torch speed in the third zone 210 until the torch head passes from the third zone 210 into a location corresponding to the second zone (e.g., zone 240 shown in FIG. 6C).

Figure 12:
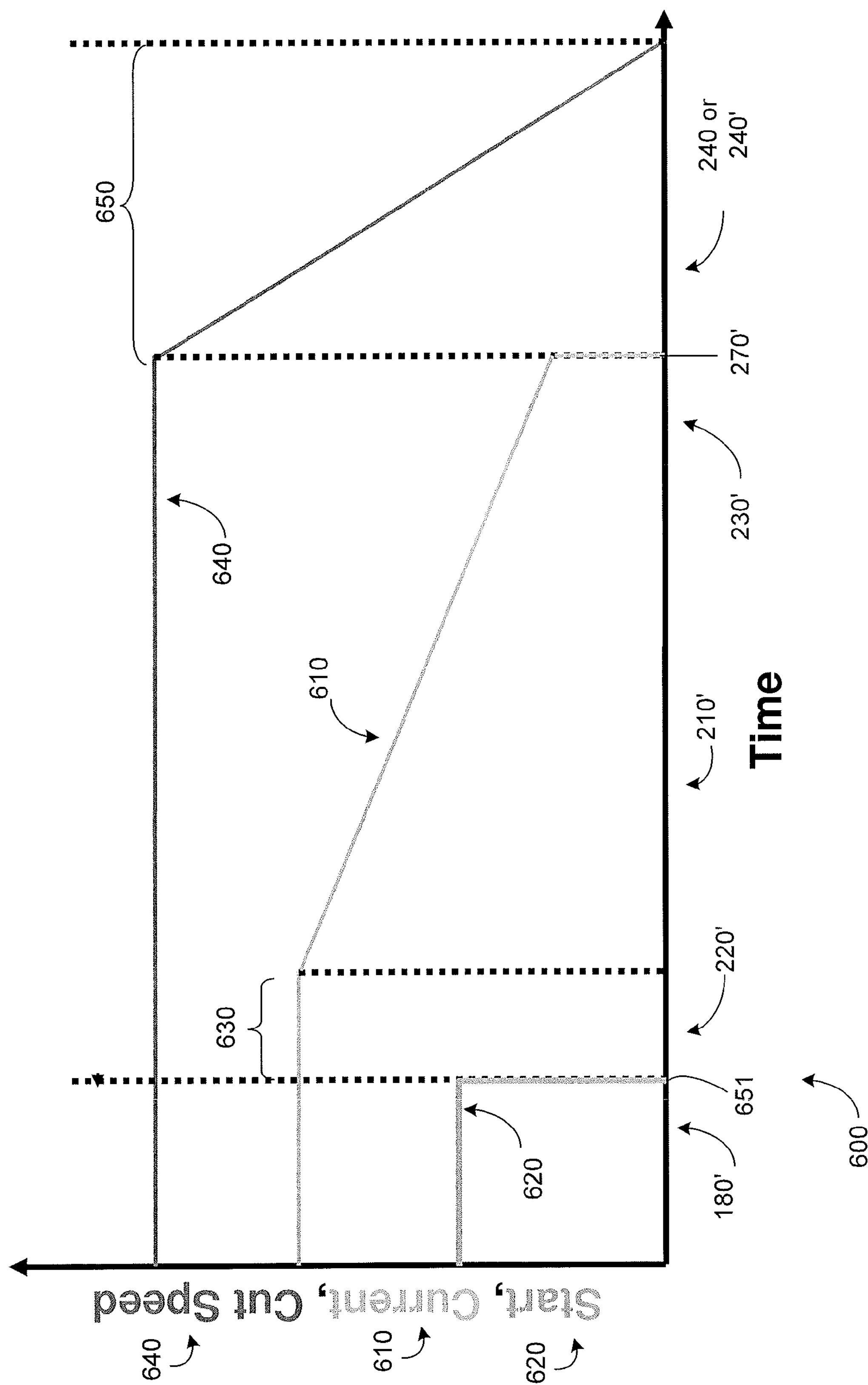
FIG. 12 is a graph showing a cutting current and a command speed as a function of time, according to an illustrative embodiment of the invention.

FIG. 12 is a graph 600 showing a cutting current and a command speed as a function of time, according to an illustrative embodiment of the invention. The process current 610 can be signaled 620 (e.g., by a CNC) to ramp down and extinguish at or substantially near the "0 degree point" 270' (e.g., where the outer kerf edge 140 of the first zone 110 merges with the outer kerf edge 250 of the third zone 210 as shown in FIG. 6C and FIG. 11). There can be a propagation delay 630 between when the signal 620 to ramp down the current is sent and when the current level actually begins to ramp down. The torch speed 640 (e.g., the torch speed) can be decelerated after the torch head passes the "0 degree point" 270' and after the current has been extinguished (e.g., after the cutting current reaches substantially zero amperes).

At least one of a plurality of cutting current ramp down operations for cutting in the third zone can be selected, where each of the plurality of cutting current ramp down operations can be a function of a diameter of the hole feature. The cutting current can be ramped down at a first point in the third zone 210' (e.g., at or near the beginning of the third zone) such that the cutting current 610 is extinguished at or substantially near a second point 270' (e.g. corresponding to point 270 as shown in FIGS. 6C-6D) in the third zone 210 where the first zone, the second zone and the third zone 210' substantially intersect (e.g., near the end 230' of the third zone 210'). The first point in the third zone can be determined/calculated using a ramp down time of the cutting current. The plasma arc torch can be decelerated so that a torch speed reaches substantially zero at a predetermined distance 650 (e.g., ¼") after the second point 270'.

The process current 610 ramp down and shut off in the third zone 210' can be performed at full process cutting speed (e.g., by substantially maintaining the command speed) or at a higher torch speed than the second zone (e.g., by increasing the command speed). The current shut off 610 can be substantially coincident with the 0 degree mark 270 (e.g., the lead-in/hole transition location or location where the first zone transitions into the second zone). In some embodiments, the torch head can be decelerated 640 to a stop at a predetermined distance 650 (e.g., ¼ of an inch) after the "0 degree mark" 270' equal to or greater than the minimum "lead-out" motion length (as described above). The plasma can be signaled 620 to ramp down at a point in time corresponding to the current ramp down time and propagation delay so that the current is extinguished when the torch reaches at or near the "0 degree point" 270. Therefore, the time interval between the point where the plasma current is signaled 620 to ramp down and the point 270 where the current is extinguished can correspond to the ramp down time.

In some embodiments, a first command (e.g., the asynchronous stop command) is established to extinguish a plasma arc at a first location along a cut (e.g., the "0 degree point" 270 of FIG. 6C and 270' of FIG. 12), the first command independent of a second command to vary a motion of the plasma arc torch. The automated process can also include establishing a negative time offset associated with the first command that determines initiation of a current ramp down at a second location 651 that precedes the first location (e.g., zero degree point 270') along the cut. The negative time offset can be a variable that determines when the plasma arc torch system initiates current ramp down. The value of the negative time offset can be chosen such that initiation of current ramp down begins when the torch reaches the second location and the current is extinguished when the time the torch reaches the first location. In some embodiments, the first location 651 corresponds to an intersection between an outer kerf edge (e.g., edge 190 of FIG. 11) of a perimeter of the hole feature being cut and an outer kerf edge (e.g., edge 140 of FIG. 11) of a lead-in of the hole feature being cut. Varying the motion of the plasma arc torch can include decelerating or accelerating the plasma arc torch. The negative time offset can be the sum of a delay 630 between the first command and initiation of the current ramp down and a time between initiation of the current ramp down and extinguishment of the plasma arc 610. In some embodiments, a negative time offset is retrieved from a cut chart (e.g., chart 660 of FIG. 13 as shown below). The negative time offset can be a function of a diameter of the hole feature being cut or a current level. Where a plurality of hole features are cut, the techniques as described herein can be performed for each hole feature being cut.

FIG. 13 is an exemplary look-up chart 660 for cutting parameters, according to an illustrative embodiment of the invention. The ramp down time of the current can be included in the cut chart 660. The current ramp down time can vary depending on the current level of the process. By way of example, a process operating with a current level of 400A can take about 250 ms to ramp down (e.g., to extinguish the current). A process operating with a current level of about 50 Amps can take about 50 ms to ramp down. Therefore, to extinguish the current at the "0 degree point" (e.g., where the outer kerf edge of the first zone merges with the outer kerf edge of the third zone as shown in FIG. 6C and FIG. 11), the CNC can signal the plasma arc torch system to ramp down the current to extinguish the current at a point based, at least, on a command speed and the ramp down time (e.g., the time taken for the current to be extinguished).

A minimum deceleration time can be defined as the minimum time that can be set for a plasma arc torch to decelerate to a stop, so that the plasma arc torch does not begin to decelerate until the arc is extinguished and the torch reaches the "0 degree point" as described above in FIGS. 6C-6D. The minimum deceleration time can be calculated by using an upper limit for the torch head speed (e.g., an 80 Amp process on a ¼" Mild Steel workpiece can use a cut speed of about 55 ipm) and a lower limit for the table deceleration (e.g., a "slow table" can have a table deceleration of about 5 mG). EQN. 1 above can be used to calculate the minimum lead-out motion length "L" (e.g., the minimum distance that can be set so that the table does not begin decelerating until after the current has been extinguished and/or after the torch head has substantially reached the "0 degree point," the minimum distance calculated for a fast torch speed and slow table) which can be about 0.25 inches given a torch speed of about 55 ipm and a table deceleration of about 5 mG. Therefore, for most processes, a plasma arc torch can be commanded to decelerate to a stop 0.25 inches after the “0 degree point” so that the plasma arc torch maintains the torch head speed until the current is extinguished. A process with a lower speed (e.g., a slower torch speed) and/or or a faster table (e.g., a greater table deceleration) will come to a stop before it reaches 0.25 inches after the “0 degree point” but the table will still decelerate after the current has been extinguished. In an alternative embodiment, the CNC negative cut off time to decelerate the torch head (e.g., to a stop) can be set to the sum of the propagation delay 630, process ramp down 610 (e.g., the time taken to ramp down the current), any additional lead-out and motion deceleration times 650.

Figure 14:
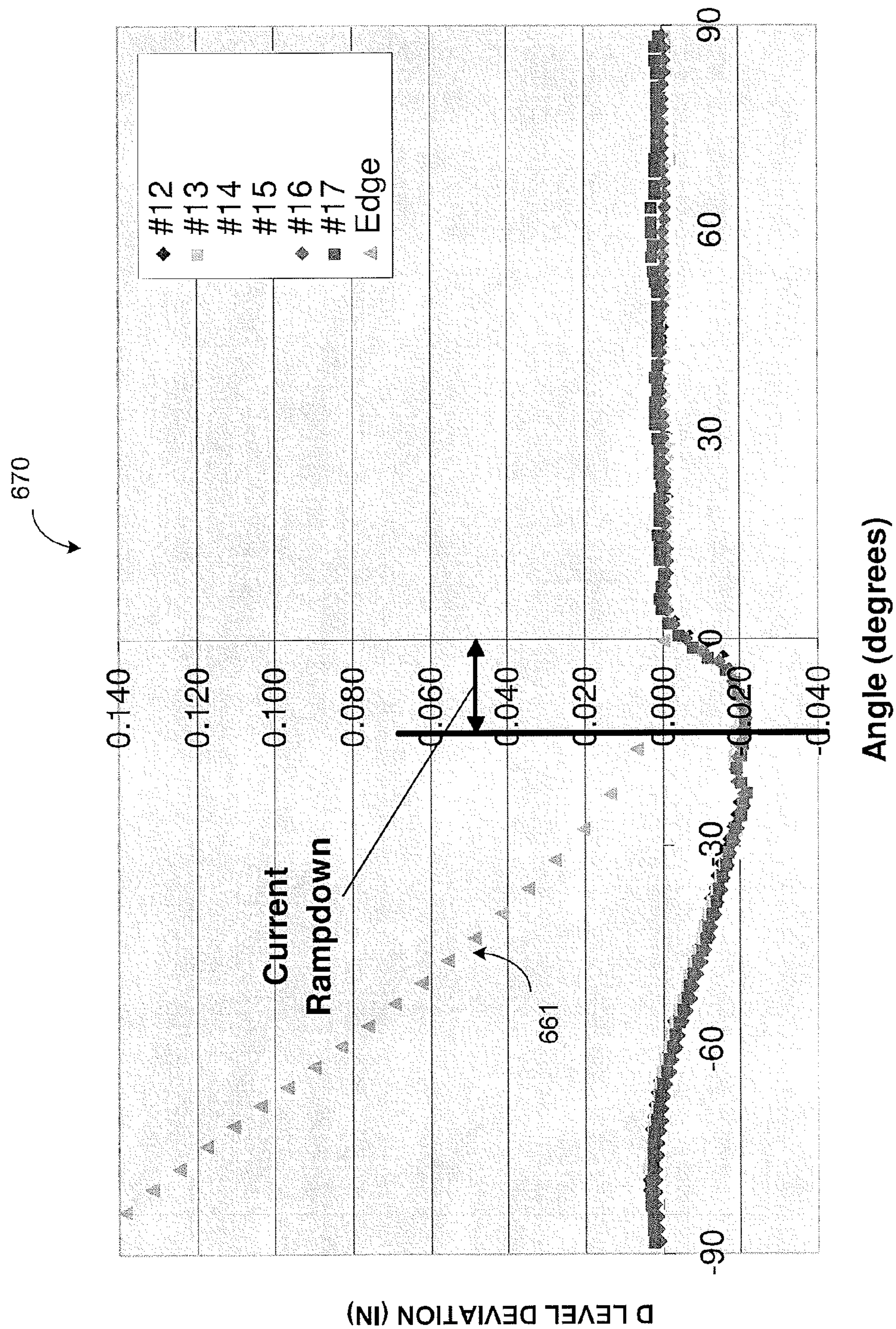
FIG. 14 is a graph showing measured deviations for a hole feature, according to an illustrative embodiment of the invention.

As described above in FIG. 9, FIG. 14 shows measurements of deviations in the hole feature in the transition area where the first zone, second zone and third zone as shown in FIGS. 6A-6C merge. Specifically, the graphs show deviations in the hole feature +90 degrees counterclockwise from the “0 degree point” and −90 degrees clockwise from the “0 degree point” as shown in FIGS. 6A-6D. Graph 670 shows measured deviations for a hole feature, according to an illustrative embodiment of the invention. Plot 661 shows the outer kerf edge of the first zone, as shown in FIG. 6A. To minimize the depth of the lead-in/lead-out form error “ding” and/or “divot”, the process ramp down (e.g., ramping down on the current in the third zone as shown in FIGS. 6C and 12) can be performed by substantially maintaining or increasing the full process cutting speed (e.g., increasing the cutting speed by setting a higher command speed). The average deviation (e.g., divot) produced in the third zone (e.g., between −90 degrees and 0 degrees as shown in FIG. 6C) for the holes was about −0.020 inches.

Figure 15:
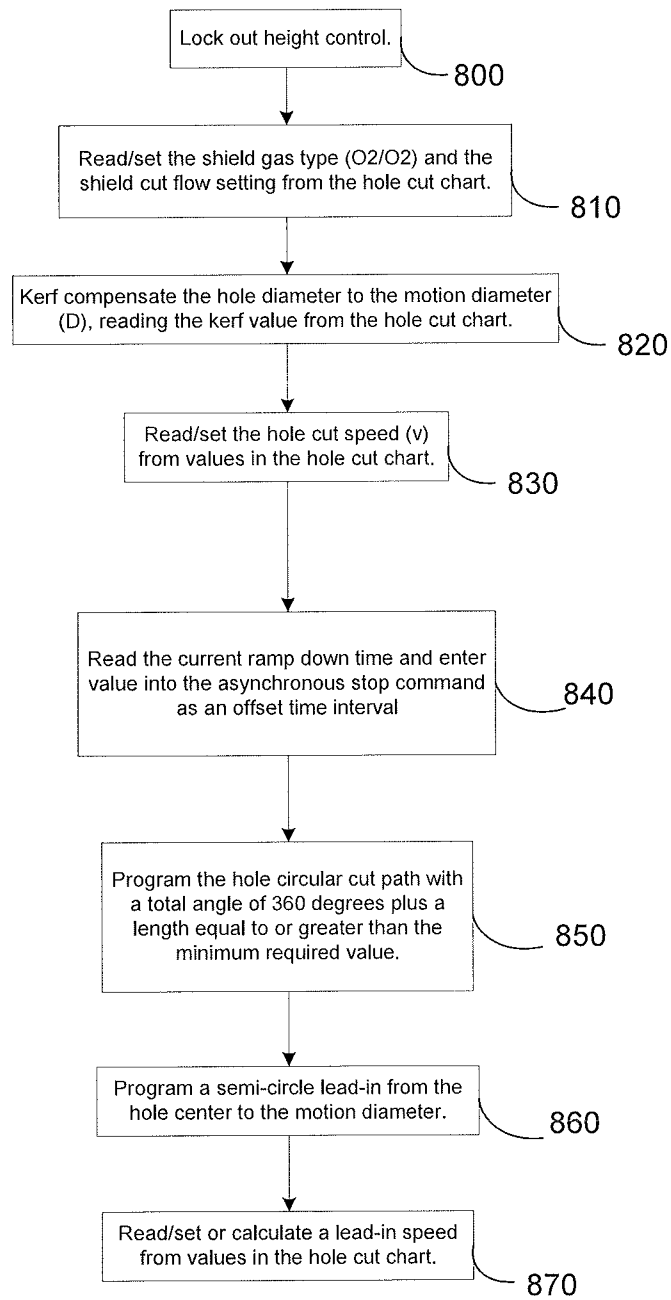
FIG. 15 shows a method for operating a plasma arc torch to cut a hole feature from a workpiece, according to an illustrative embodiment of the invention.

FIG. 15 shows an automated method for operating a plasma arc torch to cut a hole feature from a workpiece, according to an illustrative embodiment of the invention. Software can generate code for the CNC to execute and instruct the plasma system to perform a number of steps during operation of the torch. A step can include locking out height control for the plasma arc torch (step 800). The gas composition (e.g., O2/O2 for plasma/shield gas) can be set from the lookup chart (step 810). The kerf value (e.g., from a lookup chart) can be used to calculate the motion diameter from the hole feature diameter to be cut (step 820). A step can include reading/setting the command speed from values in the hole cut chart (step 830). The path used to cut the hole feature can be programmed to include a 360 degree arc, an asynchronous stop command, and a lead-out arc length (e.g., an arc in the fourth zone as shown in FIG. 6D) (step 850). The asynchronous stop command can be a command that tells the plasma arc torch to extinguish the plasma arc, but to continue moving the torch head. The torch stop command (e.g., the command to decelerate the torch to a stop) can then be given later. The asynchronous stop command can be inserted at the “0 degree point” (e.g., point 270 as shown in FIGS. 6C-6D) and can include an offset with a time interval (e.g., a negative time offset) that corresponds to the ramp down time so that the current is extinguished to substantially zero at the “0 degree point” (Step 840). The lead-out arc length can be programmed to correspond to the minimum lead-out motion length (e.g., as described above in EQN. 1), so that the torch does not begin to decelerate until after the “0 degree point” (e.g., so that the torch speed is not lowered until the current is extinguished). A lead-in shape (e.g., a semi-circle) from the hole center to the motion diameter (step 860) can be programmed. A lead-in speed can be read/set from values in the hole cut chart (e.g., command speeds for the first zone as described above) (step 870). The current ramp down time can be read from a look up table for any number of holes sizes and any significant propagation delay can be added to the time interval that offsets the asynchronous stop command as described above. Thus, an appropriate current ramp down time can be calculated for any number of hole sizes.

In some embodiments, the automated method includes cutting a plurality of hole features in a workpiece. The methods as described above can be used to cut each hole feature. Step 840 as described above, can include establishing a first location corresponding to where an outer kerf edge of a cut along a perimeter of each hole feature substantially joins the outer kerf edge of the cut along a lead-in of each hole feature (e.g., “0 degree point” 270 of FIG. 6C and 270' of FIG. 12). The method can also include establishing a second location (e.g., location 651 of FIG. 12) preceding the first location based on a hole diameter of the hole feature being cut or a cutting current level and initiating plasma arc termination at the second location such that the plasma arc is substantially extinguished when the plasma arc torch reaches the first location. The second location corresponding to initiation of current ramp down can be located along a lead-out of a cut (e.g., third zone 210 as shown in FIG. 6C and FIG. 11). In some embodiments, a plurality of hole features having different hole diameters are cut in a workpiece with a given thickness and a distance traveled by the plasma arc torch from the second location to the first location is substantially similar (e.g., the same) for the plurality of hole features. The automated method can also include determining a negative time offset based on the hole diameter of the hole feature being cut, the negative time offset determining initiation of plasma arc termination at the second location. The plurality of hole features having the plurality of hole diameters can be cut using one set of consumables for the plasma arc torch (e.g., automated process to cut the hole features without changing the consumables in the plasma torch). In some embodiments, the workpiece can be pierced to begin cutting each hole feature.

Figure 16:
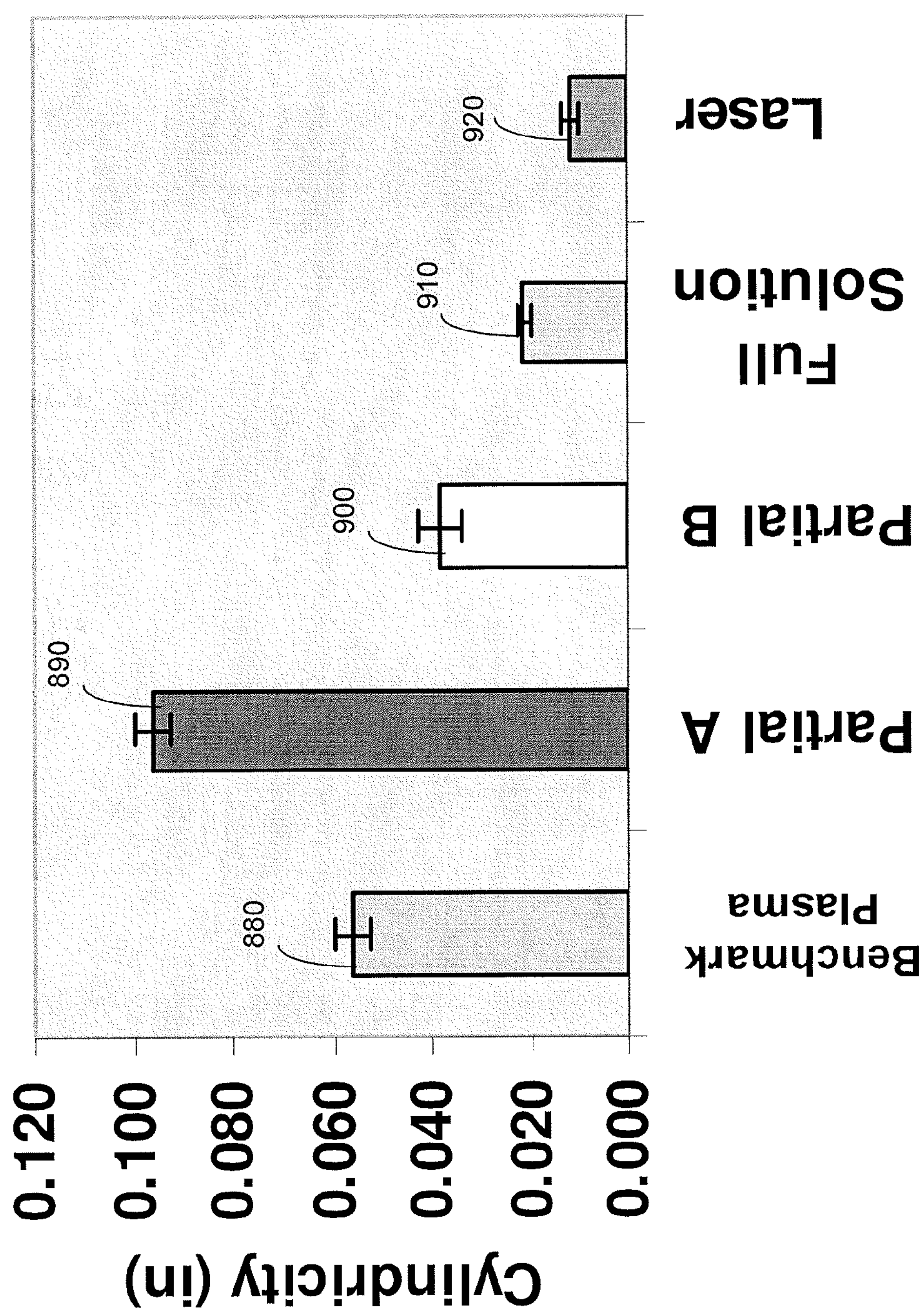
FIG. 16 is a graph showing hole quality results for holes cut from different processes.

FIG. 16 is a graph comparing hole quality results for holes cut from different processes. The graph shows the cylindricity for hole features cut using different cutting processes 880-920. Cylindricity can be a function of hole size (e.g., hole diameter). The hole features cut using processes 880-920 in FIG. 16 were each 0.394 inches in diameter, and were cut in ⅜" thick mild steel workpieces. Processes 900-910 are hole features cut from processes incorporating exemplary features of the embodiments of the invention described herein. Process 920 was a hole feature cut using a laser cutting system. While laser cutting systems have previously yielded higher quality holes (e.g., comparing Process 920 to, for example, Process 880), plasma arc torch systems are lower in cost. Therefore, there is a need for high quality holes cut from plasma arc torch systems.

The plot for Process 880 (“Benchmark Plasma”) shows the cylindricity for a hole feature cut from existing methods. The gas composition for Process 880 used $O_2$ plasma gas and Air for shield gas. A straight lead-in (e.g., straight cut for the first zone) was used and the torch was decelerated prior to the “0 degree point” (e.g., prior to extinguishing the current). The cylindricity for the hole feature cut from Process 880 was about 0.059 inches.

The plot for Process 890 (“Partial A”) shows the cylindricity for a hole feature cut where the only change from Process 880 was the gas composition. The gas composition for Process 890 was $O_2$ plasma gas and $O_2$ shield gas. The cylindricity for the hole feature cut from Process 890 was about 0.100 inches. Therefore, merely changing the shield gas composition and flow rate from Process 880 amplified the defects in the hole feature.

The plot for Process 900 ("Partial B") shows the cylindricity for a hole feature where a semi-circle shape was used to cut the first zone (e.g., a semicircle lead in) and where the command speeds for the second zone were higher than the command speed for the first zone. The torch, however, was decelerated before the current was extinguished (e.g., before the "0 degree point" as shown in FIGS. 6C-6D). The gas composition for Process 900 was $O_2$ plasma gas and $O_2$ shield gas. The cylindricity for the hole feature cut from Process 900 was about 0.039 inches. Therefore, this data shows that changing the command speeds along the cut and choosing a semi-circle lead-in improved the hole quality. A hole cut feature cut by this process has a lower cylindricity than a hole cut by using a process that has a straight lead-in and no torch speed change between the first and second zones.

The plot for Process 910 ("Full Solution") shows the cylindricity for a hole feature where a semi-circle shape was used to cut the first zone, where the command speeds for the second zone were higher than the command speed for the first zone and where the torch was decelerated after the current was extinguished (e.g., after the "0 degree point" as described above). The gas composition for Process 910 was $O_2$ plasma gas and $O_2$ shield gas. The cylindricity for the hole feature cut from Process 910 was about 0.020 inches, thereby showing improvement in cut quality as compared to the other plasma arc torch processes. A hole feature cut by this process has a lower cylindricity than a hole feature cut by a torch that was decelerated before the current was extinguished.

The plot for Process 920 ("Laser") shows the cylindricity for a hole feature cut using a laser cutting system. The cylindricity for the hole feature cut from a laser system was about 0.015 inches. Cutting a hole feature incorporating the aspects/features of the embodiments described herein, as shown in plots for Processes 900-910, improved the quality of holes cut using plasma arc torch systems.

Figure 17:
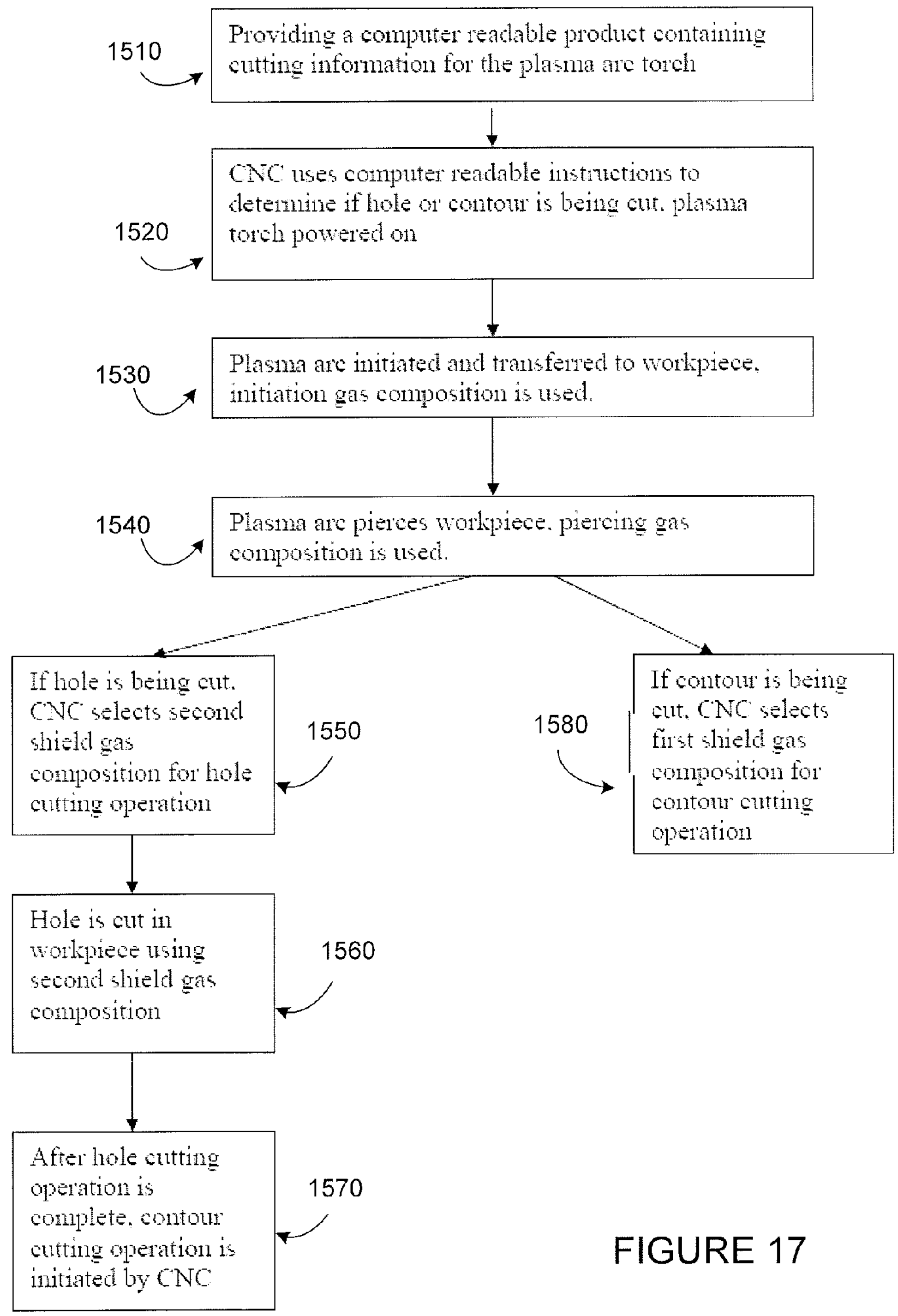
FIG. 17 is a flow diagram that shows how gas flows can be manipulated according to an illustrative embodiment of the invention.

FIG. 17 is a flow chart depicting how a processor, such as a computerized numeric controller (e.g., CNC 12 of FIG. 5), can be used to manipulate gas flows to implement principles of the invention. FIG. 17 shows flow operations that can be contained within a computer readable product which is embodied in an information carrier, according to an illustrative embodiment of the invention. Other embodiments are also within the scope of the invention. As shown in FIG. 17, a CAD file containing the part to be cut is provided to the CNC 1510, or nesting software, and based on instructions contained in the cut chart the CNC selects the shield gas composition. In another embodiment, instructions contained in the nesting software determine the shield gas composition. In some embodiments, once the CNC uses the computer readable instructions to determine if a hole feature or contour is being cut, the torch is powered on 1520 and the arc is transferred to the workpiece 1530. When the arc is initiated, the initiation shield and plasma gas is used, for example the combinations shown below in FIG. 18. After the arc is transferred to the workpiece, the torch is lowered to the workpiece and the arc pierces the workpiece 1540. In one embodiment, the arc pierces the workpiece using air as the pierce shield gas. Once the pierce step is completed, the CNC uses the computer readable instructions to select the appropriate shield gas depending on whether a hole feature or a contour is to be cut. In some embodiments, the determination as to whether a hole feature or a contour is to be cut (and selection of the appropriate shield gas composition) is based on an examination of the dimensions of the hole in relation to the thickness of the workpiece. In one embodiment, if the diameter of the feature is about 2.5 times or less than the thickness of the workpiece, then a small internal feature (e.g., hole feature) is to be cut, and the CNC selects the second shield gas 1550. In some embodiments the shield gas composition selected for hole feature cutting is $O_2$; and in some embodiments the shield gas composition is $O_2$, He, $N_2$, or a combination thereof In some embodiments, the instructions regarding the shield gas compositions are included in the instructions on the cut chart. Once the second shield gas is selected, the CNC will control the shield gas flow such that the second shield gas composition flows through the shield gas supply lines. The hole feature is then cut 1560 in the workpiece using the second shield gas composition as determined by the instructions contained in the cut chart, or designated by the nesting software. After one or more hole features are cut in the workpiece, the CNC initiates the contour cutting operations 1570.

When the CNC initiates the contour cutting operation, the arc is again initiated 1530 using the initiation shield and plasma gas for contour cutting. The arc then pierces the workpiece 1540, and as the contour cutting begins, the CNC selects the first shield gas for the contour cutting operation 1580. If it is determined that a contour is being cut, then the CNC selects the first shield gas composition for the contour cut 1580. The identification of a contour can be selected based on the shape of the cut or in the case of an internal feature, it may be based on a ratio of the diameter of the opening to be cut to the thickness the workpiece. In some embodiments when cutting a contour, the arc initiation, the piercing of the workpiece, and the contour cut are all performed using a single shield gas composition, that is, the first shield gas composition. In some embodiments, the shield gas during the arc initiation and the piercing of the workpiece is different than the shield gas used when cutting the contour shape in the workpiece. When cutting a hole feature or contour in a workpiece, the same operational steps can be followed, although different shield gas compositions may be selected for each step.

FIG. 18 is a table illustrating examples of gas combinations that can be used with an embodiment of the invention. In one embodiment, the gases are selected to provide optimal gas cutting properties based upon the plasma torch operation to be performed, such as hole feature cutting or contour cutting. The exemplary gas compositions shown in FIG. 18 are for mild steel cutting applications, although other material workpieces can be cut using different shield gas compositions that are better suited for such materials. In some embodiments, a mixture of He and $N_2$ can be used in place of oxygen for the hole feature shield gas cutting stainless steel or aluminum.

In the embodiment demonstrated in FIG. 18, while cutting either a contour or a hole feature, the system provides air as the plasma gas and the shield gas during plasma arc initiation. Air is used as the plasma gas because it tends to provide better consumable life compared to $O_2$ during arc initiation. Once the arc is initiated and transferred to the workpiece, the plasma gas is changed to $O_2$ and the shield gas remains as air for the piercing process. In this instance, the plasma gas is switched to the gas that is appropriate for the nozzle design, in this embodiment $O_2$, in order to prevent damage to the nozzle as the current is ramped up to the cutting current. In most cases it is desirable that the cutting gas be present at the time full cutting current is reached. The shield gas for the piercing process, on the other hand, remains as air. Air shield gas for piercing operations has been shown to leave a smaller pierce penetration which limits waste in the workpiece. Once the workpiece is pierced, the plasma torch will begin cutting along the edge of the penetration with the motion of the torch. In piercing, the torch is generally stationary and the object is to make a penetration completely through the workpiece. Cutting, on the other hand, involved moving the torch by severing exposed edges to create the desired shape.

Referring again to the table of FIG. 18, after the piercing step, the shield gas can be selected based upon the type of cut: a contour or a hole feature. In cutting a contour, the shield and plasma gas remain unchanged. The combination of $O_2$ plasma gas and air shield gas allows straight dross free edges and fast cut speeds (e.g., cut speeds or command speeds) when cutting contours using an $O_2$ plasma gas and air shield gas combination, however, tends to create a hole feature with a large degree of taper or bevel, creating a poor quality hole feature. By keeping $O_2$ as the plasma gas and switching the shield gas also to $O_2$ when cutting hole features or small internal features, the taper of the hole feature can be reduced if not eliminated. Taper is reduced by using an $O_2$ shield gas when cutting mild steel compared to air because the amount of nitrogen in the shield gas is reduced. Thus, other gases or gas compositions with low nitrogen content could be used in the embodiment in FIG. 18. In other embodiments, a shield gas with different composition combinations can be used when cutting hole features.

Figure 19A:
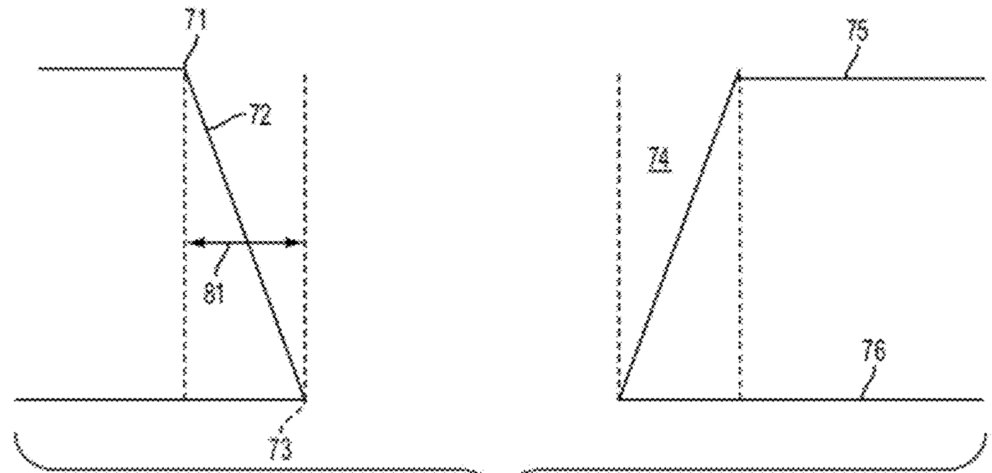
FIG. 19A is a cross section of a hole cut with the prior art cutting process.

FIG. 19A is an example of a cross sections of a hole cut using prior art cutting processes (e.g., using the same shield gas composition for both a contour cut and a hole feature cut in the same workpiece). In FIG. 19A the cylindricity (“taper” or “bevel”) of the hole can be measured by forming concentric cylinders with a diameter equal to the diameter measurement at the top 71, middle 72, and bottom 73 of the edge 74 of the hole. The greatest difference between the diameters is illustrated by the space between the arrows 81. The large difference between the radiuses of the two datum cylinders in FIG. 19A indicates a poor quality hole. Such holes can require significant post cutting treatment.

Figure 19B:
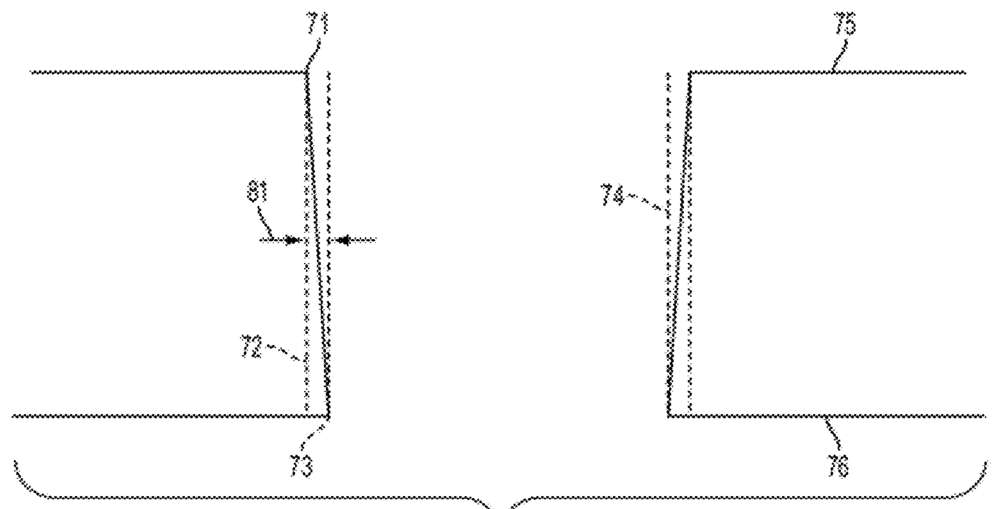
FIG. 19B is a cross section of a hole cut according to an illustrative embodiment of the invention.

FIG. 19B is a cross section of a hole feature cut with an embodiment of the present invention incorporating the exemplary techniques as described above. The cylindricity (“taper” or “bevel”) of the hole can be measured also by forming concentric cylinders with a diameter equal to the diameter measurement at the top 71, middle 72, and bottom 73 of the edge 74 of the hole. In FIG. 19B, it can be seen that the bevel or taper of the edge of the hole cut is significantly reduced as compared to the bevel of the hole edge in FIG. 19A (e.g., see also FIG. 3). Further, the reduced cylindricity can also be seen by the reduced distance between the arrows 81 as compared to FIG. 19A. With the reduced bevel or taper of the edges of the hole, the cylindricity tolerance zone between the two concentric cylinders is minimal and resulting in a much higher quality hole, requiring no post cutting treatment.

The above-described techniques can be implemented in digital electronic circuitry, or in computer hardware, firmware, software, or in combinations of them. The implementation can be as a computer program product, i.e., a computer program tangibly embodied in an information carrier (e.g., a CPS). An information carrier can be a machine-readable storage device or in a propagated signal, for execution by, or to control the operation of, data processing apparatus (e.g., a programmable processor, a computer, or multiple computers).

A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network (“LAN”) and a wide area network (“WAN”), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific illustrative embodiments, it should be understood that various changes in form and detail may be made without departing from the spirit and scope of the invention.

The invention claimed is:

1. An automated method for cutting a plurality of hole features in a part in a workpiece with a plasma arc torch while using a single plasma torch consumable configuration, the method comprising:

cutting a first hole feature in the part, the first hole feature having a first diameter, and the first hole feature being cut using a first automated process comprising:

initiating a secondary gas flow having a first gas composition; and cutting the first hole feature with a first set of cutting parameters comprising a first lead-in command speed;

cutting a second hole feature in the part, the second hole feature having a second diameter that is different than the first diameter of the first hole, and the second hole feature being cut using a second automated process comprising:

initiating the secondary gas flow having a second gas composition; and cutting the second hole feature with a second set of cutting parameters comprising a second lead-in command speed, wherein the second lead-in command speed is different from the first lead-in command speed.

2. The automated method of claim 1, wherein:

the first set of cutting parameters further includes a first perimeter command speed and the first gas composition;

the second set of cutting parameters further includes a second perimeter command speed, and the second gas composition; and the first perimeter command speed is the same as the second perimeter command speed; or the first gas composition is different from the second gas composition.

3. The automated method of claim 1 further comprising:

cutting a contour using a third automated process by:

initiating the secondary gas flow having a third gas composition, the third gas composition having a greater nitrogen content than the first and second gas compositions; and cutting the contour with a third set of cutting parameters, wherein at least one parameter of the third set of cutting parameters is different from the first or second set of cutting parameters.

4. The automated method of claim 1, wherein the first gas composition and the second gas composition are substantially the same.

5. The automated method of claim 1 wherein:

cutting the first hole feature with the first set of cutting parameters includes:

moving the plasma arc torch to a first location;

cutting a first lead-in by ramping up a cutting speed up to the first lead-in command speed;

increasing the cutting speed after the first lead-in to cut a first perimeter;

initiating current ramp down after an inner kerf edge of the first perimeter substantially intersects an outer kerf edge of the first lead-in; and maintaining or increasing the cutting speed until a cutting current is extinguished, wherein the cutting current is extinguished at or near where an outer kerf edge of the first lead-in substantially joins an outer kerf edge of the first perimeter;

cutting the second hole feature with the second set of cutting parameters includes:

moving the plasma arc torch to a second location;

cutting a second lead-in by ramping up the cutting speed up to the second lead-in command speed, the second lead-in command speed being greater than the first lead-in command speed;

increasing the cutting speed after the second lead-in to cut a second perimeter;

initiating current ramp down after an inner kerf edge of the second perimeter substantially intersects an outer kerf edge of the second lead-in; and maintaining or increasing the cutting speed until the cutting current is extinguished, wherein the cutting current is extinguished at or near where an outer kerf edge of the second lead-in joins an outer kerf edge of the second perimeter.

6. The automated method of claim 5 further comprising cutting the first hole feature or the second hole feature by initiating current ramp down at a point based on a diameter of the first hole feature or the second hole feature.

7. A plasma arc torch system for cutting a plurality of hole features in a workpiece, the plasma arc torch system including a plasma arc torch and a computer numerical control device comprising a non-transitory executable code that when executed by the plasma arc torch system instructs the computer numerical control device to operate the plasma arc torch according to the method of claim 1.

8. The automated method of claim 2 further comprising:

cutting a contour using a third automated process by:

initiating the secondary gas flow having a third gas composition, the third gas composition having a greater nitrogen content than the first and second gas compositions; and cutting the contour with a third set of cutting parameters, wherein at least one parameter of the third set of cutting parameters is different from the first or second set of cutting parameters.

9. The automated method of claim 8, wherein the third set of cutting parameters includes a contour command speed and the third gas composition.

10. The automated method of claim 9, wherein the contour command speed is greater than the first lead-in command speed, the first perimeter command speed, the second lead-in command speed and the second perimeter command speed.

* * * * *